(12) United States Patent
Goswami et al.

(10) Patent No.: US 12,229,031 B2
(45) Date of Patent: Feb. 18, 2025

(54) GENERATING, AGGREGATING, AND QUERYING VIRTUALIZATION SERVICE EXECUTION METRICS FOR CLOUD DIAGNOSTICS AT SCALE

(71) Applicant: MICROSOFT TECHNOLOGY LICENSING, LLC, Redmond, WA (US)

(72) Inventors: Satish Goswami, Redmond, WA (US); Harish Srinivasan, Sammamish, WA (US); Omar Cardona, Bellevue, WA (US); Alexander Malysh, Bothell, WA (US); Chenyan Liu, Redmond, WA (US); Tom Xanthos, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 17/807,197

(22) Filed: Jun. 16, 2022

(65) Prior Publication Data
US 2023/0409458 A1 Dec. 21, 2023

(51) Int. Cl.
*G06F 11/00* (2006.01)
*G06F 11/30* (2006.01)
(Continued)

(52) U.S. Cl.
CPC ........ *G06F 11/3075* (2013.01); *G06F 11/301* (2013.01); *G06F 11/3082* (2013.01);
(Continued)

(58) Field of Classification Search
CPC .............. G06F 11/3075; G06F 11/301; G06F 11/3409; G06F 11/3476; G06F 11/3082;
(Continued)

(56) References Cited

U.S. PATENT DOCUMENTS 9,081,829 B2 7/2015 Bhave et al.
9,172,608 B2 10/2015 Zeyliger et al.
(Continued)

OTHER PUBLICATIONS

"Google Cloud Metrics", Retrieved from: https://web.archive.org/web/20220213104810/https://cloud.google.com/monitoring/api/metrics_gcp, Feb. 13, 2022, 221 Pages.
(Continued)

*Primary Examiner* — Elmira Mehrmanesh

(57) ABSTRACT

Techniques for aggregating execution metrics during virtualization are provided. In some embodiments, aggregated execution metrics (e.g., average execution time) are generated and stored for different types of supported virtualization service operations executed by a virtualization service provider (VSP) in a virtualization stack handling requests from a virtualization service client (VSC) running in a computer system emulator. For example, execution calls to the VSP are intercepted, and execution metrics for a triggered virtualization service operation are generated and aggregated into an aggregation entry that represents aggregated performance (e.g., average execution time) of all instances of the virtualization service operation that were completed during an interval (e.g., 1 hour). Aggregated execution metrics may be stored for any number of historical intervals. Since aggregated execution metrics are effectively compressed, diagnostic information about a variety of different types of virtualization service operations may be stored and used to diagnose and repair underperforming components.

20 Claims, 10 Drawing Sheets

(51) Int. Cl.
*G06F 11/34* (2006.01)
*G06N 20/00* (2019.01)

(52) U.S. Cl.
CPC ...... *G06F 11/3409* (2013.01); *G06F 11/3452* (2013.01); *G06N 20/00* (2019.01); *G06F 11/3419* (2013.01); *G06F 11/3476* (2013.01)

(58) Field of Classification Search
CPC .. G06F 11/3419; G06F 11/3452; G06N 20/00
See application file for complete search history.

(56) References Cited

U.S. PATENT DOCUMENTS

| | | | |
|---|---|---|---|
| 9,507,682 | B2 | 11/2016 | Buxbaum et al. |
| 9,614,745 | B2 | 4/2017 | Mathur et al. |
| 10,305,758 | B1* | 5/2019 | Bhide ................. G06F 11/3409 |
| 11,375,012 | B2 | 6/2022 | Alshawabkeh |
| 11,900,169 | B1* | 2/2024 | Dhandhania ........... G06N 20/00 |
| 12,093,709 | B1 | 9/2024 | Chraim |
| 2008/0320122 | A1* | 12/2008 | Houlihan .............. G06F 9/4856 709/224 |
| 2009/0132602 | A1* | 5/2009 | Brown .................. G06F 16/217 |
| 2011/0246171 | A1 | 10/2011 | Cleeton et al. |
| 2012/0216207 | A1* | 8/2012 | Krishnakumar ...... G06F 9/4881 718/103 |
| 2013/0013953 | A1 | 1/2013 | Eck et al. |
| 2014/0215464 | A1* | 7/2014 | Birke .................... G06F 9/5027 718/1 |
| 2014/0280970 | A1 | 9/2014 | Pijewski |
| 2014/0337429 | A1 | 11/2014 | Asenjo et al. |
| 2015/0121365 | A1 | 4/2015 | Nowatzki |
| 2015/0195182 | A1* | 7/2015 | Mathur ............... G06F 11/2289 714/27 |
| 2016/0034295 | A1 | 2/2016 | Cochran |
| 2016/0266920 | A1 | 9/2016 | Atanasov |
| 2016/0323377 | A1 | 11/2016 | Einkauf et al. |
| 2017/0373937 | A1 | 12/2017 | Hovhannisyan et al. |
| 2018/0081704 | A1* | 3/2018 | Hirt ..................... G06F 11/3409 |
| 2019/0026210 | A1* | 1/2019 | Buxbaum ........... G06F 11/3409 |
| 2019/0132190 | A1 | 5/2019 | Jeyakumar |
| 2021/0271506 | A1 | 9/2021 | Ganguly |
| 2022/0382610 | A1* | 12/2022 | Miller .................. G06F 11/079 |
| 2023/0409361 | A1 | 12/2023 | Goswami |
| 2023/0409455 | A1 | 12/2023 | Goswami |

OTHER PUBLICATIONS

"Poor Performance While Deploying Virtual Machines over the Network (2052302)", Retrieved from: https://web.archive.org/web/20220127195548/https://kb.vmware.com/s/article/2052302, Jan. 27, 2022, 5 Pages.

"Using Performance Hub to Analyze Database Performance", Retrieved from: https://web.archive.org/web/20210516002854/https:/docs.oracle.com/en-us/iaas/Content/Database/Tasks/perfhub.htm, May 16, 2021, 4 Pages.

"International Search Report and Written Opinion Issued in PCT Application No. PCT/US23/022292", Mailed Date: Aug. 18, 2023, 13 Pages.

"International Search Report and Written Opinion Issued in PCT Application No. PCT/US23/023288", Mailed Date: Aug. 30, 2023, 13 Pages.

"International Search Report and Written Opinion issued in PCT Application No. PCT/US23/022291", Mailed Date: Sep. 8, 2023, 12 Pages.

Non-Final Office Action mailed on Dec. 20, 2024, in U.S. Appl. No. 17/807,205, 15 pages.

* cited by examiner

GENERATING, AGGREGATING, AND QUERYING VIRTUALIZATION SERVICE EXECUTION METRICS FOR CLOUD DIAGNOSTICS AT SCALE

BACKGROUND

Virtualization creates a simulated or virtual computing environment, and often includes computer-generated versions of hardware, operating systems, storage devices, and more. Virtualization allows partitioning a single physical computer or server into several virtual machines. Each virtual machine may then interact independently and run different operating systems or applications while sharing the resources of a single host machine. By creating multiple resources from a single computer or server, virtualization improves scalability and workloads while resulting in the use of fewer overall servers, less energy consumption, and less infrastructure costs and maintenance. Examples of virtualization include desktop virtualization, which allows one centralized server to deliver and manage individualized desktops, network virtualization, which splits network bandwidth into independent channels to then be assigned to specific servers or devices, software virtualization, which separates applications from the hardware and operating system, and storage virtualization, which combines multiple network storage resources into a single storage device where multiple users may access it.

A hypervisor is a virtualization platform that allows multiple isolated operating systems to share a single hardware platform. For example, a hypervisor can provide isolated execution environments called partitions, in which operating systems may execute. The hypervisor provides each partition with access to hardware resources of the host computer, such as memory, devices, and CPU cycles, and the hypervisor controls and manages each partition's access to the underlying hardware. The parent partition runs a management operation system that hosts various virtualization service providers (VSPs), and child partitions run a software version of a computer, often referred to as virtual machine, that runs various virtualization service clients (VSCs). VSPs and VSCs coordinate to provide virtual machines access to hardware, storage, network, and other resources.

One place virtualization is used is in distributed computing systems, such as cloud computing platforms that provide on-demand access to shared computing resources (e.g., network, compute, and storage). A customer of a cloud computing platform may pay for a particular cloud computing service model in exchange for using computing resources of the platform, and access to the platform's computing resources may be provided via virtual machines.

SUMMARY

Implementations described herein provide methods and systems for aggregating execution metrics for various types of virtualization service operations during virtualization. In an example implementation, aggregated execution metrics (e.g., average execution time) are generated and stored for different types of virtualization service operations executed by a virtualization service provider (VSP) in a virtualization stack handling requests from a virtualization service client (VSC) running in a virtual machine. For example, execution calls to the VSP are intercepted, and execution metrics for a triggered operation are generated and aggregated into an aggregation entry that represents aggregated performance (e.g., average execution time) of all instances of the virtualization service operation that were completed during an interval (e.g., one hour). Aggregated execution metrics may be stored for any number of historical intervals (e.g., one month's worth). Because aggregated execution metrics are effectively compressed, diagnostic information about a variety of different types of virtualization service operations may be stored, and used to diagnose and repair underperforming components.

Furthermore, because aggregated execution metrics for different types of virtualization service operations are effectively compressed, the reduced storage footprint enables in-memory processing. As such, some embodiments aggregate and store execution metrics in-memory (e.g., a portion of RAM, virtual memory, process memory, or kernel memory allocated to the virtualization stack), enabling faster lookup, faster processing (e.g. aggregation), and better CPU utilization. The benefits are compounded when implemented on multiple (e.g., every) machine in a fleet, or when implemented multiple times for each virtualization service provider on a given machine.

In some embodiments, to efficiently aggregate execution metrics for different types of virtualization service operations, a dual list structure is used to compute and store aggregated execution metrics for different types of virtualization service operations. In an example implementation, a current list or other structure is used to aggregate execution metrics over a particular interval (e.g., one hour), and when the interval expires, the entries in the current list are pushed to a historical list or other structure storing aggregated execution metrics for historical intervals. In this example, each list includes a plurality of multi-dimensional entries, where each entry stores aggregated execution metrics for a different type of supported virtualization service operation, and each dimension of each entry stores a different type of aggregated execution metric (e.g., count, minimum/maximum/average execution times, minimum/maximum/average queue time). The ordering of these aggregation entries, which may represent aggregated execution metrics for different types of virtualization service operations, may be based on the first time a corresponding type of virtualization service operation completed execution during the particular interval being tracked. Managing the data this way facilitates more efficient storage, retrieval, and aggregation. The benefits are compounded when implemented on every machine in a fleet, or when implemented multiple times for each virtualization service provider on a given machine.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The methods and systems disclosed herein are described in detail below with reference to the attached drawing figures, wherein.

DETAILED DESCRIPTION

Overview

Figure 1:
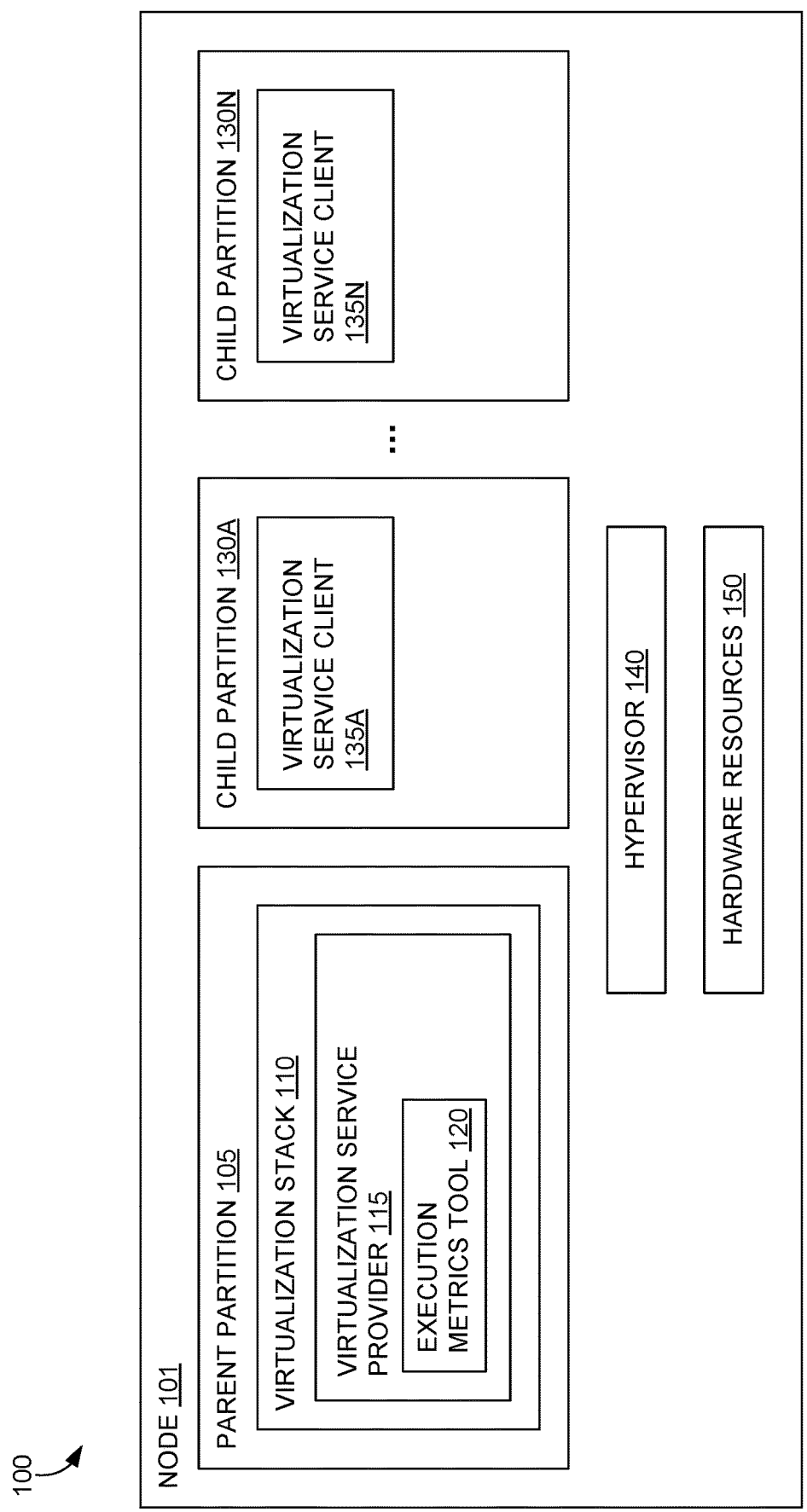
FIG. 1 is a block diagram of an example computing system suitable for generation of execution metrics, in accordance with embodiments.

One measure of a virtual machine's performance is known as virtual machine availability. For example, a cloud computing provider may commit to providing connectivity to at least one instance of a virtual machine some threshold percentage of the time. Take an example scenario where a customer submits a request to create a virtual machine on a particular physical machine. In this and other scenarios, parent and child partitions typically trigger and execute various management operations, orchestrated through a hypervisor. As a result, a given request will flow through a number of different software components, any of which may experience resource contention. As a result, the user may experience a delay between the time he or she submits the request and the time the virtual machine is created. In some scenarios that involve resource contention, the delay could last on the order of minutes. Currently, however, there is no way to identify the exact component where the contention happened.

More specifically, there are often multiple software components involved in configuring a virtual machine, or performing a virtualization service operation. Any of these software components can impact virtual machine availability or performance of a virtualization service operation. In scenarios where virtual machine availability or performance of a virtualization service operation is less than desired, it may be important to diagnose which component(s) caused or contributed to a degradation in availability or performance (e.g., in order to take remedial action). However, conventional techniques for diagnosing issues with software components involved configuring a virtual machine, or performing a virtualization service operation are lacking.

For example, one conventional technique for diagnosing availability or performance issues is through logging or event tracing. However, when system event logs are running continuously, log data can overwhelm storage capacity. Additionally, in many cases, event tracing has to be manually triggered to begin collecting event logs. As a result, availability or performance issues may not be reflected in available log data. Furthermore, this type of log data typically reflects raw data, including information which is often not useful and can actually impede effective search, retrieval, and analysis.

Even considering a particular type of virtualization service operation, logging execution metrics for each instance in which that type of virtualization service operation was executed is often impractical and inefficient. As noted above, not only is storage capacity typically insufficient to store execution metrics for every instance of a virtualization service operation, but also execution metrics are often noisy, so storing these metrics may not be justified. These issues are compounded in the context of cloud computing, where each different type of configuration command is decomposed into a particular set of virtualization service operations that have a particular flow through many different software components. As a result, diagnosing issues with virtualization components is often very complex, or the relevant metrics may simply be unavailable. Thus, degradations that occur in the provision of various virtualization services often go undiagnosed and unresolved. As such, there is a need for improved techniques to facilitate diagnosing issues with the provision of virtualization services.

Accordingly, various implementations of the present disclosure are directed to generation, aggregation, storage, and querying of execution metrics for virtualization service operations. In an example embodiment, a VSP (e.g., a virtualized switch running in a virtualization stack) is provisioned with an execution metrics tool that intercepts executions, and generates aggregated execution metrics (e.g., minimum and maximum execution times) for different types of virtualization service operations. Aggregation may occur over a designated interval for each of a plurality of supported types of virtualization service operations. In some embodiments, the aggregated execution metrics are generated, stored, and updated using in-memory processing, as using in-memory processing facilitates more efficient retrieval, aggregation, and storage. At the end of each interval, aggregated execution metrics for that interval are pushed to a data structure (e.g., in-memory) that stores aggregated execution metrics for historical intervals. The aggregated execution metrics facilitate processing and provide an efficient representation of execution metrics for a potentially huge number of virtualization service operations. As such, the aggregated execution metrics can be more efficiently queried to identify and facilitate mitigation of anomalous executions in the VSP.

Generally, aggregated execution metrics may be generated for any type of configuration command (e.g., configuring a virtual machine) and/or any corresponding virtualization service operation executed by any number and/or any type of VSP. Different VSPs (e.g., running in a virtualization stack) may handle different types of requests from VSCs (e.g., running in a virtual machine), including device access requests (e.g., to access network, memory, storage, compute hardware), emulation requests, and/or other types. As an example, depending on the hardware a VSC is requesting to access, different types of VSPs may be involved. For example, in some embodiments where a VSC is trying to access network hardware (e.g., such as a physical network adapter or network interface card on a host computer), the VSP is a network VSP that acts as a virtualized network adapter, virtualized switch, network or protocol driver (e.g., a Network Driver Interface Specification (NDIS) driver), or otherwise handles network access requests. In some embodiments, the VSP is a storage VSP that handles VSC storage requests. In other embodiments, the VSP handles VSC requests to access other host hardware (e.g., CPU).

In some embodiments, aggregated execution metrics are generated for virtualization service operations associated with any number and type of configuration commands that create, delete, configure, or otherwise impact a virtual machine, such as commands to create or delete a virtual machine, accelerate network hardware for a virtual machine (e.g., by enabling or removing an offload such as a checksum offload or setting up multiple queues, adding or removing a network adapter to or from a virtual machine, configuring receive side scaling (RSS), allocating virtual ports), or otherwise configure hardware or software to support a virtual machine. In order to implement these configuration commands, a VSC may send to a VSP a command, request, or other signal triggering the VSP to execute various constituent virtualization service operations. The VSP may then generate and aggregate execution metrics for each (e.g., designated) type of virtualization service operation, such as different types of hardware configuration operations (e.g., networking, storage, memory, compute configuration operations), child partition or virtual machine management operations, emulation operations, and/or others. The different types of virtualization service operations will typically depend on the configuration command in question. Taking configuration commands for a virtualized network switch as an example, virtualization service operations may include operations triggered by input/output controls (IOCTLs), object identifier (OID) method requests, worker threads, Remote NDIS (RNDIS) messages, Transmission Control Protocol/Internet Protocol (TCP/IP) operations, and/or others.

In some embodiments, execution metrics are generated and aggregated for different types of virtualization service operations executed by different types of VSPs to facilitate diagnosing which component of a virtualization stack is causing a degradation to virtual machine availability. In some cases, severe performance impacts can degrade customer experience and violate an availability commitment (e.g., made in a service level agreement). On the other hand, performance degradation in certain virtualization service operations may have little to no impact on customer experience. As such, it can be helpful to understand which stack(s) and/or which specific component(s) of a particular stack might be contributing to an overall performance degradation. In that regard, some embodiments generate and aggregate execution metrics for different types of VSPs, such as those operating in different stacks of a virtualization stack (e.g., networking stack, storage stack, memory stack, compute stack), different layers of a particular stack (e.g., whether in a control path layer, a data path layer, a synthetic path layer providing emulation functionality), and/or otherwise. As a result, execution metrics can be used to diagnose whether or not a performance degradation is due to networking, for example, and to diagnose in which service, component, and/or layer the issue is occurring.

In an example embodiment, a VSP is provisioned with an execution metrics tool comprising an execution monitor that intercepts and/or tracks executions of virtualization service operations and/or execution calls from a VSC to the VSP. At a high level, the execution monitor may generate aggregated execution metrics (e.g., count, average execution duration, minimum execution duration, maximum execution duration, average queue duration, minimum queue duration, maximum queue duration) for each supported virtualization service operation during a particular interval of time (e.g., one hour, whether configurable or by design). At the end of the interval, these aggregated execution metrics may be pushed into a data structure that stores aggregated execution metrics for historical intervals. In an example implementation, aggregated execution metrics for the current interval and for historical intervals are stored in corresponding data structures such as a list (e.g., a current list for the current interval and a historical list for historical intervals). For example, each supported virtualization service operation may be assigned its own entry in a list, where each entry is a multi-dimensional structure (e.g., struct, array, vector) with different dimensions that store different types of aggregated execution metrics for the supported virtualization service operation assigned to the entry.

In an example implementation, the execution monitor initiates a current interval (e.g., by recording a starting timestamp, setting a timer) and begins tracking executions of supported virtualization service operations. In some embodiments, at completion of each supported virtualization service operation, the execution monitor determines whether the current interval has expired (e.g., by subtracting a current timestamp from the recorded starting timestamp and comparing the difference to a designated interval duration, checking a timer). If the current interval has not expired, the completed virtualization service operation is classified (e.g., by unique identifier, or for supported groups of operations, by unique combination of category and operation identifier). The execution monitor may then determine whether an aggregation entry exists for that type of virtualization service operation (e.g., in the current list of entries representing aggregated execution metrics for different types of virtualization service operations during a current interval). If an aggregation entry does not exist, a new entry may be allocated for that type of virtualization service operation (e.g., keyed by the unique identifier or unique combination of category and operation identifier), and execution metrics for the completed instance are computed and stored in the entry. If an aggregation entry already exists, execution metrics for the completed instance are computed, and the aggregated metrics stored in the aggregation entry are updated based on the execution metrics for the completed instance (e.g., a counter is updated, running averages are updated).

Generally, generation and aggregation of execution metrics may continue in this manner until a determination is made that the current interval has expired. In this scenario, all the entries in the current list representing aggregated execution metrics for the current (now expired) interval may be pushed to another (historical) list representing aggregated execution metrics for historical intervals. In some embodiments, the current list is then cleared, a new interval is initiated, and execution metrics for the most recently completed execution (e.g., the execution that triggered the determination that the current interval has expired) are computed and used to populate the first entry in the current list (now representing the new interval).

In some embodiments, the historical list of entries representing aggregated execution metrics for different types of virtualization service operations aggregated across historical intervals includes different entries for the same type of virtualization service operation, where the different entries represent aggregated execution metrics for the same type of virtualization service operation but from different historical intervals. In other words, in some embodiments, instead of aggregating execution metrics over multiple intervals, aggregated execution metrics for each supported virtualization service operation are stored in separate entries for each historical interval. This way, aggregated execution metrics for a particular time interval may be subsequently queried, retrieved, and used for diagnostic purposes. In some embodiments, execution metrics for current and/or historical intervals are aggregated (e.g., including storing, retrieving, updating) using in-memory processing (e.g., in random access memory, virtual memory, process memory, kernel memory) to facilitate more efficient retrieval and aggregation. The historical data stored in-memory may be limited (e.g., to the previous 30 days), and expired data may be exported and/or deleted (e.g., on a first-in-first-out basis).

The techniques described herein provide a number of benefits over prior techniques. Whereas conventional event tracing can overwhelm storage capacity when continuously running, the present techniques effectively generate and store compressed execution metrics, freeing up storage capacity and permitting continuous operation without manual intervention. Similarly, the present aggregation techniques enable storing execution metrics that represent a larger timeline using a smaller storage footprint, and hence, represent historical execution metrics more efficiently than prior techniques. Furthermore, storing aggregated execution metrics facilitates more efficient retrieval and analysis over prior techniques that store raw data and other detail, which impose computational burdens on retrieval and analysis.

Additionally, storing and processing aggregated execution metrics in-memory facilitates faster lookup, faster processing (e.g., aggregation), better CPU utilization, reduced storage and retrieval times, and more efficient retrieval and aggregation over prior techniques that store metrics on disk, thereby freeing up computational resources for other tasks. The impact is particularly notable for embodiments that generate aggregated execution metrics for virtualization service operations that complete, for example, every 10 microseconds, or in embodiments where execution metrics are generated and aggregated for multiple types of virtualization service operations on multiple machines (e.g., every machine) in a fleet (e.g., in a distributed computing environment).

Aggregated execution metrics may be configured and used in a variety of ways. For example, a configuration interface may expose one or more configurable parameters (e.g., setting the interval length, setting the history length, enabling or disabling supported virtualization service operations). In some embodiments, a querying interface is provided to facilitate diagnosing performance issues related to virtualization service operations and for understanding performance trends. In some embodiments, aggregated execution metrics (e.g., representing instances of one or more types of supported virtualization service operations executed during a particular interval) are encoded (e.g., a single dimensional vector representing aggregated execution metrics for a particular operation classification, a multi-dimensional representation such as a matrix, image, or tensor representing aggregated execution metrics for different types of virtualization service operations in different dimensions) and applied to a machine learning model (e.g., a neural network) trained to detect anomalous behavior (e.g., based on manually tagged instances of anomalous behavior). As such, some embodiments employ one or more machine learning models to run on aggregated execution metrics (e.g., in real time) to continuously monitor performance. In some embodiments, the one or more machine learning models include a classifier (e.g., a binary classifier) that predicts whether encoded execution metrics (e.g., execution duration for a particular operation, aggregated execution metrics) for a particular type of virtualization service operation are anomalous. In some embodiments, prediction of such an anomaly triggers a corresponding log entry and/or a notification (e.g., to an administrator interface) to flag a lagging component and facilitate a reduction in the time it takes to diagnose the issue.

As such, execution metrics for virtualization service operations (such as those that create, delete, configure, or otherwise impact a virtual machine) may be generated and aggregated to facilitate diagnosis of lagging components (e.g., in a virtualization stack). Execution metrics (e.g., execution duration) may be aggregated for each supported virtualization service operation over a particular interval, and aggregated execution metrics for a plurality of historical intervals may be stored and/or queried.

Example Virtualization Environment

FIG. 1 is a block diagram of an example virtualization environment 100 suitable for use in implementing aspects of the systems and methods described herein. Generally, virtualization environment 100 facilitates generation, aggregation, storage, and querying of execution metrics for virtualization service operations.

At a high level, virtualization environment 100 includes node 101, which may be any suitable kind of computing device such as computing device 1000, as described below with reference to FIG. 10. Further, in some implementations, virtualization environment 100 is implemented at least in part in a distributed computing environment such as distributed computing environment 900 (discussed below with respect to FIG. 9) comprising a plurality of such computing devices. In some embodiments, node 101 is a personal computer (PC), a laptop computer, a smartphone, a tablet computer, a smart watch or other wearable computer, a personal digital assistant (PDA), a music player, a global positioning system (GPS) device, a video player, a handheld communications device, a gaming device or system, an entertainment system, a vehicle computer system, an embedded system controller, a camera, a remote control, a bar code scanner, a computerized measuring device, a workstation, or any combination of these delineated devices, or any other suitable computer device.

In various implementations, node 101 and/or other components of virtualization environment 100 that are not illustrated in FIG. 1 include computer storage media that stores information including data, data structures, computer instructions (e.g., software program instructions, routines, or services), and/or models (e.g., 3D models, machine learning models) used in some embodiments of the technologies described herein. For example, in some implementations, node 101 comprises one or more data stores (or computer data memory). Additionally or alternatively, any or all of the computing devices include or are coupled to any number of data stores (e.g., using local and/or cloud storage), and/or any data or components described herein may be stored on any suitable data store(s) and any suitable device(s).

In an example embodiment, node 101 is coupled to one or more computing devices such as a client device and/or other nodes in a distributed computing environment via a network. The network may include one or more local area networks (LANs) and/or wide area networks (WANs). Such networking environments are commonplace in offices, enterprise-wide computer networks, intranets, and the Internet.

In the example illustrated in FIG. 1, node 101 includes parent partition 105 that runs virtualization stack 110, which itself includes VSP 115 that includes execution metrics tool 120. In some embodiments, execution metrics tool 120 is integrated into an application (e.g., that provides or supports a virtualization service operation of a virtualization stack), an operating system (e.g., running in kernel mode), a server (e.g., a remote server), and/or a distributed computing environment (e.g., hosting a cloud service). Depending on the embodiment, various allocations of functionality are implemented across any number and/or type(s) of devices. In the example illustrated in FIG. 1, execution metrics tool 120 (or some portion thereof) is integrated into VSP 115, which runs in virtualization stack 110 in parent partition 105. In another embodiment, execution metrics tool 120 (or some portion thereof) is integrated into virtualization service client 135a running in child partition 130a, or into hypervisor 140. In another example, one or more components of execution metrics tool 120 (or some portion thereof) are distributed across partitions or across devices, and coordinate (e.g., via hypervisor 140, or a network) to execute the functionality described herein. These are just examples, and any suitable allocation of functionality among these or other devices is possible within the scope of the present disclosure. The features of the implementation illustrated in FIG. 1 (and the features of the implementations illustrated in the other figures) can work together or apart from one another.

As a high-level overview of an example implementation and workflow, node 101 (e.g., VSP 115) is configured to execute some type of virtualization service operation on behalf of one or more clients. In FIG. 1, the client is one or more of VSC 135a-n running in corresponding child partitions 130a-n on node 101. Additionally or alternatively, the client may run on some remote device. In some embodiments, the virtualization service operation facilitates and provides access to computing resources, such as hardware resources 150 of node 101 (e.g., network, storage, or compute hardware). In an example scenario, a user operating node 101 configures one or more child partitions 130a-n with an emulated computer that runs any type of VSC 135a-n (e.g., any type of operating system, application, or other software), for example, to provide isolation, run a cloned system, try a new operating system, and/or the like. In another example scenario, node 101 is part of a distributed computing environment (e.g., cloud computing platform 910 of FIG. 9), and a customer interfacing with the distributed computing environment issues some type of configuration command that that creates, deletes, configures, or otherwise impacts a virtual machine (e.g., in one or more of child partitions 130a-n), such as commands to create or delete a virtual machine, accelerate network hardware for a virtual machine, or otherwise configure hardware or software to support a virtual machine. VSPs may decompose different types of configuration commands into different types of virtualization service operations and execute different types of virtualization service operations in response to a corresponding configuration command. As such, in some embodiments, one or more VSPs (e.g., VSP 115) coordinate with one or more VSCs (e.g., VSC 135a-n) to provide the VSCs access to hardware resources 150. In association with the provision of such services, an execution metrics tool associated with each VSP (e.g., execution metric tool 120) may generate and aggregate execution metrics representing the performance of different types of virtualization service operations executed by the VSP.

As used herein, a virtualization service operation is an executable operation that configures hardware and/or software on a host machine, or otherwise facilitates or supports virtualization, on behalf of a virtualization service client. Example virtualization service operations include those involved in managing creation and/or execution of child partitions and/or virtual machines, managing access by child partitions and/or virtual machines to hardware resources (e.g., handling hardware access requests, such as requests to access network, storage, memory, and/or compute hardware), providing emulation functionality, and/or others.

Taking an implementation where node 101 runs a hypervisor such as Hyper-V as an example, node 101 includes parent partition 105, which is the first partition on node 101 (the host computer). Parent partition 105 may have privileged access to the physical resources of the host computer (e.g., hardware resources 150), such as access to memory and devices. The parent partition may be responsible for starting hypervisor 140 and/or creating child partitions 130a-n. In some embodiments, there is only one parent partition 105, which hosts a management operating system (e.g., and runs under hypervisor 140 on node 101). In some embodiments, virtualization stack 110 runs in parent partition 105. Virtualization stack 110 may include a collection of software components that manage the creation and execution of child partitions (e.g., under hypervisor 140). Virtualization stack 110 may manage access by child partitions 130a-n to hardware resources 150 on node 101.

Virtualization stack 110 may run and/or the management operating system may host any number of VSPs, such as VSP 115. A VSP is a program that provides or otherwise facilitates access to network, storage, compute, and/or other resources on a host computer. A VSP may handle different types of requests from different types of VSCs, including device access requests (e.g., to access network, memory, storage, compute hardware), emulation requests, and/or other types of requests, by executing one or more virtualization service operations corresponding to a particular request. VSPs and VSCs coordinate to provide virtual machines access to hardware, storage, network, and other resources. In some embodiments, VSP 115 communicates with child partitions 130a-n (e.g., over a bus, such as VMBus) to handle requests (e.g., device access requests) from child partitions 130a-n and/or provide child partitions 130a-n access to hardware resources of node 101 (the host computer). In some embodiments, a guest operating system on a child partition hosts one or more VSCs (e.g., VSC 135a) that redirect device requests to corresponding VSPs in the management operating system (e.g., using the bus).

Depending on the implementation, VSP 115 may provide or otherwise facilitate access to network, storage, compute, and/or other resources. Taking networking as an example, VSP 115 may be a network VSP, and VSC 135a may be a network VSC, such that networking requests and packets are sent between each network VSC and the network VSP running in the management operating system (e.g., VSP 115). In this example, VSP 115 may expose a virtualized view of a physical network adapter on node 101 (a virtualized network adapter). Other potential networking roles played by VSP 115 may include a virtualized switch that connects virtual machines to a virtualized network adapter (or to other virtual machines), a network or protocol driver (e.g., that provides services to support networking access), and/or others. Generally, VSP 115 may facilitate access to one or more hardware resources 150, and may play other roles such as that of a virtualized CPU, virtualized memory, filter driver, and/or others.

In some embodiments, each child partition is created through parent partition 105. There may be one or more child partitions 130a-n (e.g., that run under hypervisor 140) on node 101, and each child partition may provide an isolated execution environment that hosts a guest operating system that runs its own isolated computer system emulator (e.g., a virtual machine or software container). Generally, a virtual machine is a virtual guest computer that is implemented in software and is hosted within a physical host computer. A virtual machine may emulate a complete hardware system, from processor to network adapter, in a self-contained, isolated execution environment. As such, a virtual machine may enable concurrent operation of otherwise incompatible operating systems.

In FIG. 1, node 101 includes VSC 135a-n running in child partitions 130a-n. A virtualization service client is a program that runs in a computer system emulator (e.g., a virtual machine or software container) on a host machine and coordinates with a VSP to request and obtain access to hardware, storage, network, or other resources of the host computer for the computer system emulator. VSCs may utilize hardware resources 150 that are provided by VSPs (e.g., VSP 115) in parent partition 105. VSCs may communicate with corresponding VSPs in parent partition 105 (e.g., over a bus such as VMBus) to satisfy device I/O requests of their child partition. Taking networking as an example, VSC 135a may be a network VSC that exposes a virtualized network adapter, accesses an extensible switch to forward packets over a network interface managed by the switch (e.g., by connecting to a port on an extensible switch, passing messages over a bus to an associated network VSP driver), provides one or more functions of a network or a protocol driver, and/or otherwise. Generally, VSC 135a may connect to a VSP playing various types of roles (e.g., virtualized network adapter, virtualized switch, virtualized CPU, network or protocol driver, virtualized memory, filter driver, and/or others) to facilitate access to one or more corresponding hardware resources 150.

Hypervisor 140 may be a layer of software that runs between physical hardware (e.g., hardware resources 150) and one or more operating systems that run in partitions (e.g., parent partition 105, child partitions 130a-n). Generally, hypervisor 140 may create and manage isolated execution environments (e.g., partitions), and may provide each isolated execution environment with a portion of hardware resources 150, such as memory, devices, and CPU cycles. As such, hypervisor 140 may control and arbitrate access from each partition to the underlying hardware.

Generally, a VSP (e.g., each of a plurality of VSPs) may be provisioned with an execution metrics tool (e.g., execution metrics tool 120) configured to generate and/or aggregate execution metrics that quantify performance of various types of supported virtualization service operations executed by the VSP. As used herein, an execution metric is any type of data that quantifies or represents a measure of performance in completing an execution, such as duration queued prior to execution, duration of execution, or whether or not an execution was completed. In some embodiments, execution metrics tool 120 stores and updates aggregated execution metrics in-memory (e.g., random-access memory (RAM) or flash memory) using in-memory processing. As used herein, in-memory processing (or simply memory processing) refers to reading and processing data stored in memory (e.g., RAM or flash memory), as opposed to reading and processing data stored on a hard disk. Depending on the implementation, execution metrics tool 120 may store and update aggregated execution metrics in a portion of process memory (e.g., allocated to the kernel, virtualization stack 110, VSP 115), such as a portion of the memory available to node 101 (e.g., RAM, virtual memory) that is allocated to operating system processes (e.g., kernel memory).

Figure 2:
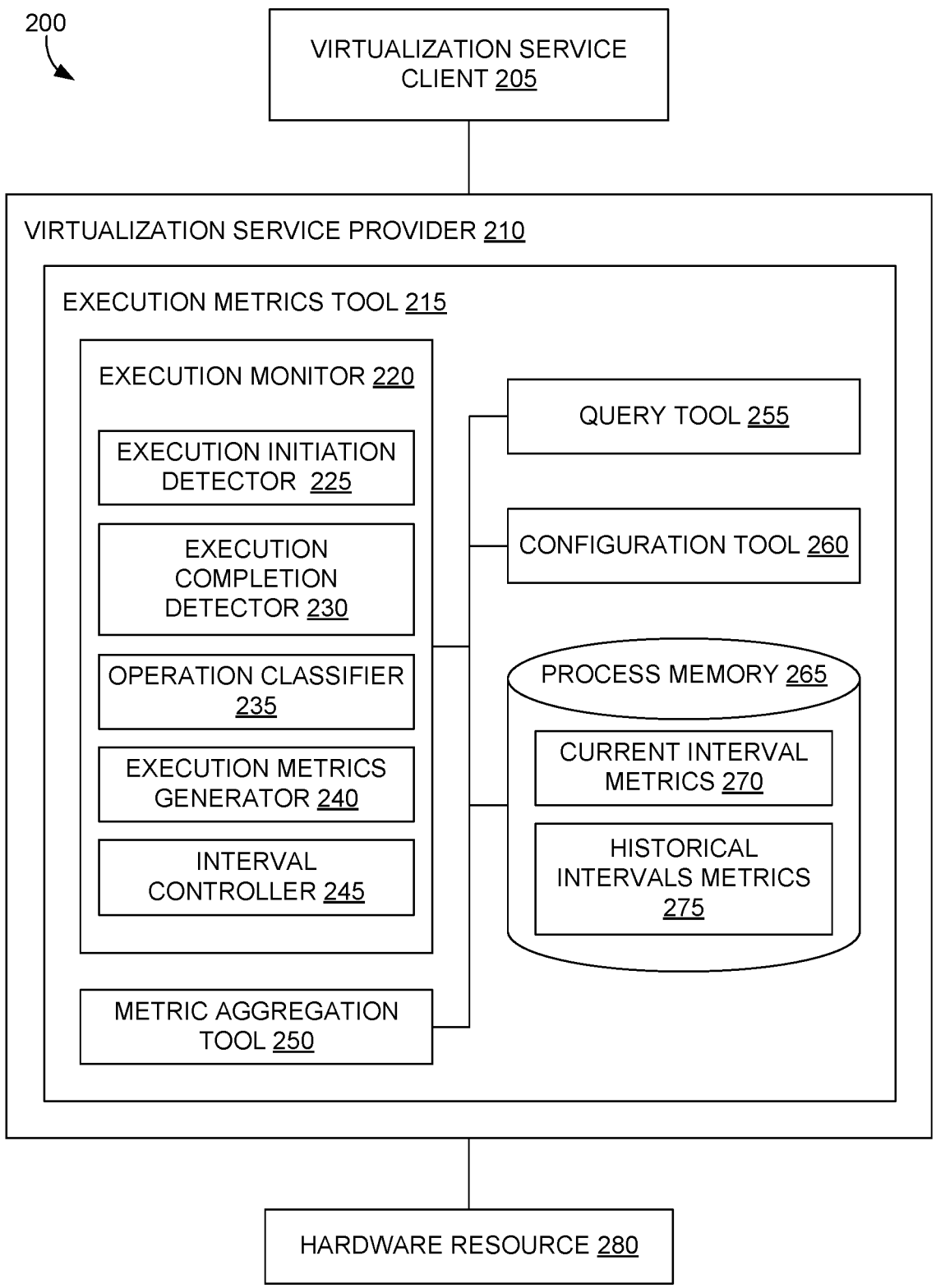
FIG. 2 is a block diagram of an example virtualization environment with an example execution metrics tool, in accordance with embodiments.

FIG. 2 is a block diagram of an example virtualization environment 200 with an example execution metrics tool 215, in accordance with embodiments of the present disclosure. In this implementation, virtualization environment 200 includes VSC 205 (e.g., VSC 135a-n of FIG. 1), VSP 210 (e.g., VSP 115 of FIG. 1), and hardware resource 280 (e.g., hardware resources 150 of FIG. 1). VSP 210 includes execution metrics tool 215 (e.g., execution metrics tool 120 of FIG. 1).

In the example illustrated in FIG. 2, execution metrics tool 215 includes execution monitor 220, metric aggregation tool 250, query tool 255, configuration tool 260, and process memory 265. At a high level, execution monitor 220 intercepts and/or tracks supported virtualization service operations and/or execution calls and triggers metric aggregation tool 250 to generate and/or aggregate execution metrics (e.g., current interval metrics 270 and historical intervals metrics 275) for the supported virtualization service operations. Query tool 255 may provide notifications of anomalous components, and/or may provide an interface for querying and retrieving current interval metrics 270 and/or historical intervals metrics 275 from process memory 265. Configuration tool 260 provides an interface for configuring one or more parameters used by execution monitor 220 in generating aggregated execution metrics (e.g., an interval length, a duration of historical intervals, which virtualization service operations are tracked with aggregated execution metrics).

In the example illustrated in FIG. 2, execution monitor 220 includes execution initiation detector 225, execution completion detector 230, operation classifier 235, execution metrics generator 240, and interval controller 245. At a high level, execution initiation detector 225 detects initiation of a supported virtualization service operation and triggers operation classifier 235 and/or execution metrics generator 240 to generate and store information about the initiated virtualization service operation. Execution completion detector 230 detects completion of an initiated virtualization service operation and triggers execution metrics generator 240 to generate and/or aggregate execution metrics about the initiated virtualization service operation. Interval controller 245 tracks, updates, and/or otherwise controls the interval over which execution metrics are aggregated. In some embodiments, once the current interval has expired (e.g., as determined by interval controller 245), execution metrics generator 240 pushes current interval metrics 270 to historical intervals metrics 275, and initiates a new interval.

More specifically, in an example implementation, execution initiation detector 225, execution completion detector 230, and/or execution metrics generator 240 generate and store aggregated execution metrics for a current interval in current interval metrics 270. For example, execution initiation detector 225 may intercept executions of virtualization service operations and/or execution calls, detect an initiation of a supported virtualization service operation, determine that a supported virtualization service operation has or will be initiated, and/or responsively trigger execution metrics generator 240 to measure or record (e.g., in process memory 265) a representation of when the supported virtualization service operation began running and/or other metrics associated with execution initiation such as the amount of time a corresponding request was queued before the supported virtualization service operation began running. In some embodiments, execution completion detector 230 tracks supported virtualization service operations that have begun running, detects a completion of a supported virtualization service operation, determines that a supported virtualization service operation has or will be completed, and/or responsively triggers execution metrics generator 240 to measure or record (e.g., in process memory 265) a representation of corresponding completion metrics (e.g., when the supported virtualization service operation finished running).

In some embodiments, execution metrics are aggregated for multiple instances of the same type of virtualization service operation during a particular interval. For example, for any particular detected and/or tracked virtualization service operation, operation classifier 235 may determine some unique identifier (or combination of category and identifier) that uniquely identifies the virtualization service operation. In some embodiments, supported virtualization service operations are structured into groups (e.g., IOCTLs, OIDs, worker threads, RNDIS messages), with each group including a number of supported virtualization service operations. As such, operation classifier 235 may determine a unique identifier for a supported virtualization service operation, for example, by mapping an intercepted execution call (or one or more components of an intercepted execution call) to a unique identifier for a corresponding virtualization service operation. As such, the unique identifier (or unique group plus identifier) may be used to indicate the types of virtualization service operations that should have their execution metrics aggregated. In some embodiments, the supported virtualization service operations are configurable (e.g., via configuration tool 260).

At a high level, execution metrics generator 240 may generate various types of aggregated execution metrics (e.g., execution count, average execution duration, minimum execution duration, maximum execution duration, average queue duration, minimum queue duration, maximum queue duration). In an example implementation, at the completion of each supported virtualization service operation, execution completion detector 230 triggers interval controller 245 to determine whether the current interval has expired (e.g., by checking a timer, comparing a current timestamp with a recorded timestamp corresponding to the start of the current interval). If the current interval has not expired, operation classifier 235 may determine a unique identifier for the completed operation, and execution metrics generator 240 may determine whether an aggregation entry corresponding to the unique identifier exists in current interval metrics 270. If an aggregation entry does not exist, execution metrics generator 240 may allocate a new entry for that unique identifier, and execution metrics generator 240 may compute and store execution metrics for the completed instance in the entry. If an aggregation entry already exists, execution metrics generator 240 may retrieve the entry from process memory 265, compute updated aggregated execution metrics (e.g., execution count, minimums, maximums, and averages), and record the updated aggregated execution metrics in the entry in current interval metrics 270 of process memory 265.

If interval controller 245 determines that the current interval has expired, interval controller 245 pushes the entries from current interval metrics 270 into historical interval metrics 275, clears current interval metrics 270, and/or initializes a new interval. In some embodiments, interval controller 245 triggers execution metrics generator 240 to generate execution metrics for the most recently completed execution (e.g., the one that triggered the determination that the current interval has expired) and store the execution metrics in a first entry in current interval metrics 270.

Figure 3:
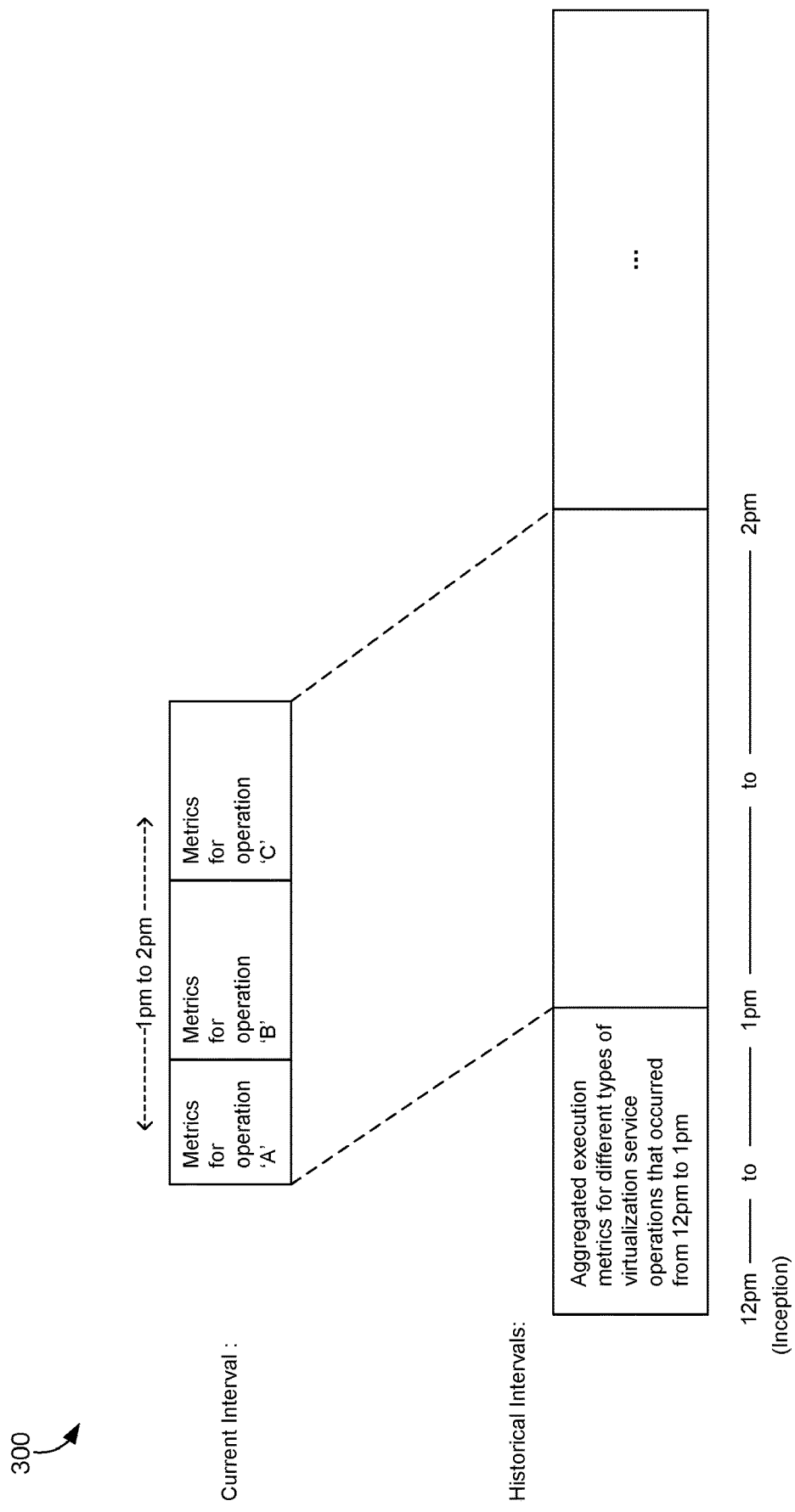
FIG. 3 illustrates example aggregated execution metrics for various intervals, in accordance with embodiments.

In an example implementation, current interval metrics 270 and historical interval metrics 275 take the form of a list or other data structure representing multiple aggregation entries for different types of supported virtualization service operations. FIG. 3 illustrates example aggregated execution metrics 300 for various intervals, in accordance with embodiments of the present disclosure. In an example implementation, during any particular interval (e.g., from 1 pm to 2 pm), a new entry is allocated for a supported virtualization service operation (e.g., operation A) the first time an instance of the supported virtualization service operation completes execution during the interval. If subsequent instances of operation A complete execution during the same interval, execution metrics are aggregated into the existing entry for operation A. As a result, the order of entries in the list may represent the first time a corresponding type of virtualization service operation completed execution during a particular interval. Managing the data this way facilitates more efficient storage, retrieval, and aggregation. The benefits are compounded when implemented on multiple machine in a fleet, or when implemented multiple times for each VSP on a given machine. At the completion of the interval, the aggregated metrics for the interval may be pushed to a portion of memory storing aggregated execution metrics for historical intervals, and any given type of virtualization service operation may have multiple entries corresponding to different historical intervals. In some embodiments, the amount or duration of the historical intervals for which aggregated execution metrics are stored is limited. For example, once an allocated limit has been reached, when new historical data entries are pushed into storage, and the oldest historical data entries may be retired to make room.

To illustrate the memory footprint of the historical data entries, by way of example, assume the total amount of memory consumed can be calculated as the number of supported virtualization service operations*size of each entry (e.g., approximate 60 bytes)*the number of total historical intervals. Taking an example scenario with 405 different types of supported virtualization service operations and a four week history, the theoretical total memory consumption would be 405*60 bytes*672 intervals=~16 MB. In operation, however, not all supported virtualization service operations will execute during each interval, and in fact, the number of different types of virtualization service operations that execute in any given interval may be substantially lower, on the order of 50 distinct types. In that case, an expected memory footprint would be 50*60 bytes*672 intervals=~2 MB. This small storage footprint enables embodiments to support storing and processing aggregated execution metrics for large numbers of virtualization service operations in-memory, facilitating faster and more efficient computations.

As such, the aggregated execution metrics can be queried (e.g., using query tool 255 of FIG. 2) to identify and facilitate mitigation of anomalous executions in the virtualization service provider. For example, an engineer may use query tool 255 to discover a particular type of virtualization service operation associated with a particular piece of hardware is taking a long time, in which case, the engineer may decide to restart the hardware, upgrade the hardware, or replace the hardware. Additionally or alternatively, query tool 255 may determine (e.g., using one or more machine learning models, by calculating availability based on execution times and comparing to corresponding commitment in a service level agreement) that a particular virtualization service operation is displaying anomalous behavior based on its aggregated execution metrics, and in response, may automatically restart the corresponding hardware, trigger a notification, or other mitigation. As such, query tool 255 can facilitate diagnosing a machine for virtualization service related performance issues and understanding performances trends.

Example Flow Diagrams

With reference now to FIGS. 4-8, flow diagrams are provided illustrating methods for generating aggregated execution metrics. Each block of the methods 400-800 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Figure 4:
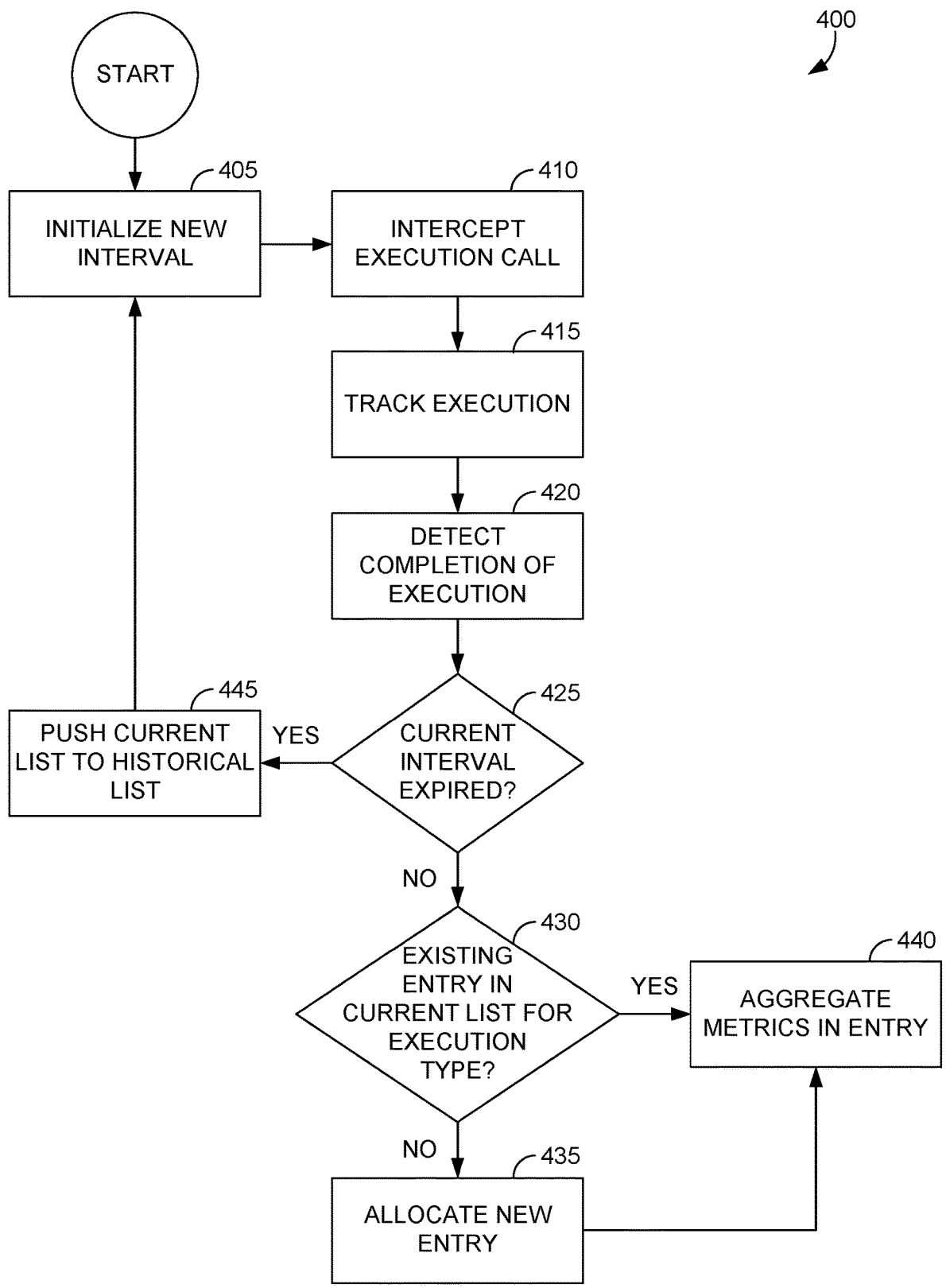
FIG. 4 is a flow diagram showing a method for aggregating executing metrics, in accordance with embodiments.

Turning to FIG. 4, FIG. 4 illustrates a method 400 for aggregating execution metrics, in accordance with embodiments of the present disclosure. Initially at block 405, a new interval is initialized (e.g., by interval controller 245 of FIG. 2). For example, generation of execution metrics may be manually initialized (e.g., via configuration tool 260 of FIG. 2), triggered upon startup of a particular machine or component, and/or otherwise. In some embodiments, initializing a new interval includes starting a timer, recording a timestamp representing the start time of the new interval, or otherwise.

At block 410, an execution call is intercepted, and at block 415, a corresponding execution of a virtualization service operation is tracked. In an example implementation, a VSP such as VSP 210 of FIG. 2 is provisioned with an execution metrics tool (e.g., execution metrics tool 215 of FIG. 2) that intercepts and tracks different types of virtualization service operations (e.g., managing creation and execution of child partitions or virtual machines, managing access to hardware resources or otherwise handling device access requests from child partitions or virtual machines, providing emulation functionality). In some embodiments, tracking a particular execution includes a determination of the particular type of execution, that the particular type of execution is configured for generating execution metrics. Tracking may include starting a timer, recording a timestamp representing the start time of the execution, and/or otherwise.

At block 420, completion of the execution is detected (e.g., by execution completion detector 230 of FIG. 2). In this example, upon detecting completion of the execution, at decision block 425, a determination is made (e.g., by interval controller 245 of FIG. 2) whether or not the current interval has expired. If the current interval has not expired, at decision block 430, a determination is made (e.g., by execution metrics generator 240) whether or not a current list of aggregated execution metrics includes an entry for the type of execution that just completed. If not, at block 435, a new entry is allocated in the list for that type of execution (e.g., by execution metrics generator 240). Whether advancing from block 435 or from decision block 430, method 400 advances to block 440, where execution metrics (e.g., execution duration, duration queued before execution) for the execution that just completed are determined and/or accessed (e.g., by execution metrics generator 240), and execution metrics are aggregated (e.g., by metric aggregation tool 250) into the entry in the current list for the type of execution that just completed. Example aggregated execution metrics for a particular type of virtualization service operation include execution count, average/max/min execution duration, and average/max/min queue duration, to name a few examples.

Method 400 may continue generating and aggregating metrics by intercepting execution calls at block 410 and following the method flow described above, for example, until a determination is made at decision block 425 that the current interval has expired. In that scenario, at block 445, the entries in the current list are pushed to a historical list of aggregated execution metrics (e.g., in-memory, such as a portion of RAM, virtual memory, process memory, or kernel memory allocated to a virtualization stack). Method 400 may then return to block 405, initializing a new interval, and repeating the method flow described above to generate and aggregate execution metrics over any number of intervals.

Figure 5:
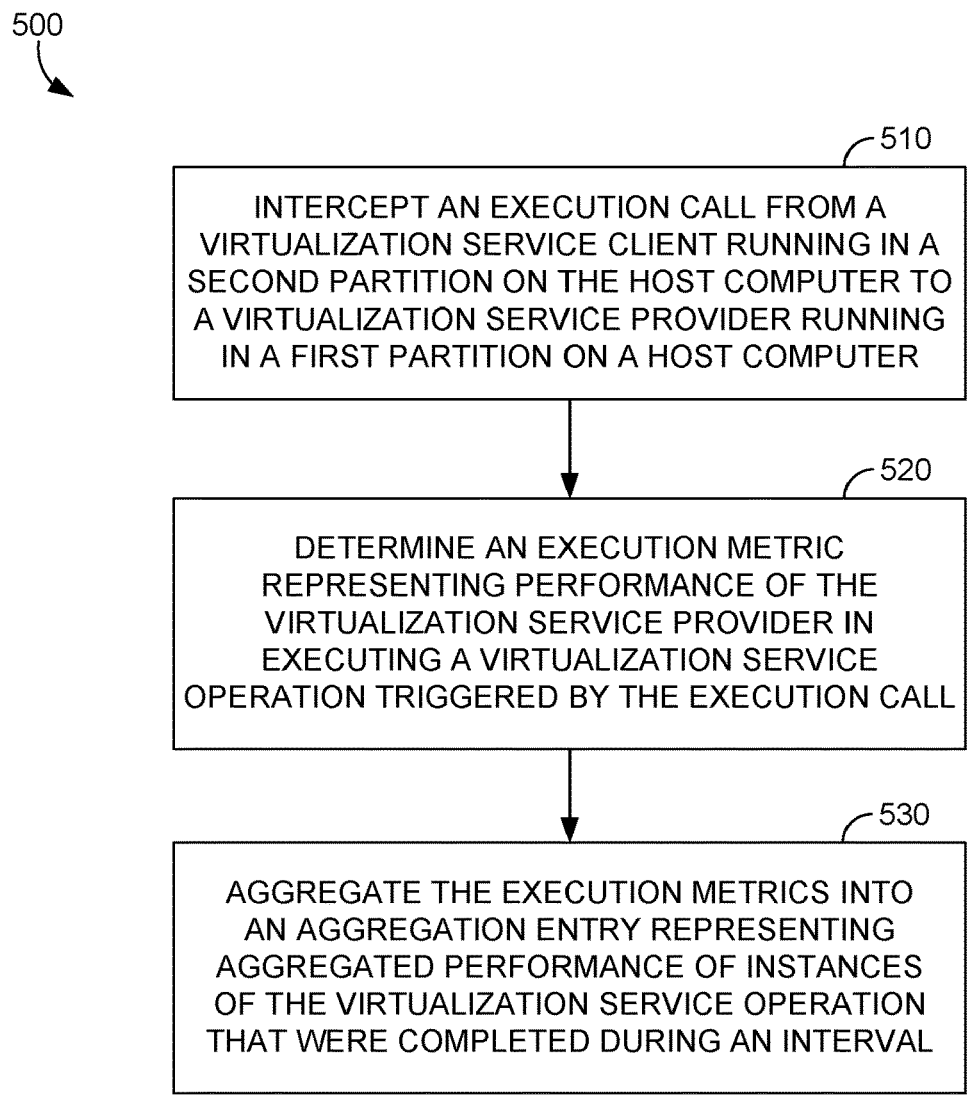
FIG. 5 is a flow diagram showing a method for aggregating execution metrics representing performance of a virtualization service provider, in accordance with embodiments.

FIG. 5 illustrates a method 500 for aggregating execution metrics representing performance of a virtualization service provider, in accordance with embodiments of the present disclosure. Initially at block 510, an execution call, from a virtualization service client running in a second partition on the host computer to a virtualization service provider running in a first partition on a host computer, is intercepted (e.g., by execution monitor 220 of FIG. 2). At block 520, an execution metric representing performance of the virtualization service provider in executing a virtualization service operation triggered by the execution call is determined (e.g., by execution metrics generator 240 of FIG. 2, based at least on intercepting the execution call). At block 530, the execution metrics are aggregated into an aggregation entry representing aggregated performance of instances of the virtualization service operation that were completed during an interval (e.g., by metric aggregation tool 250 of FIG. 2).

Figure 6:
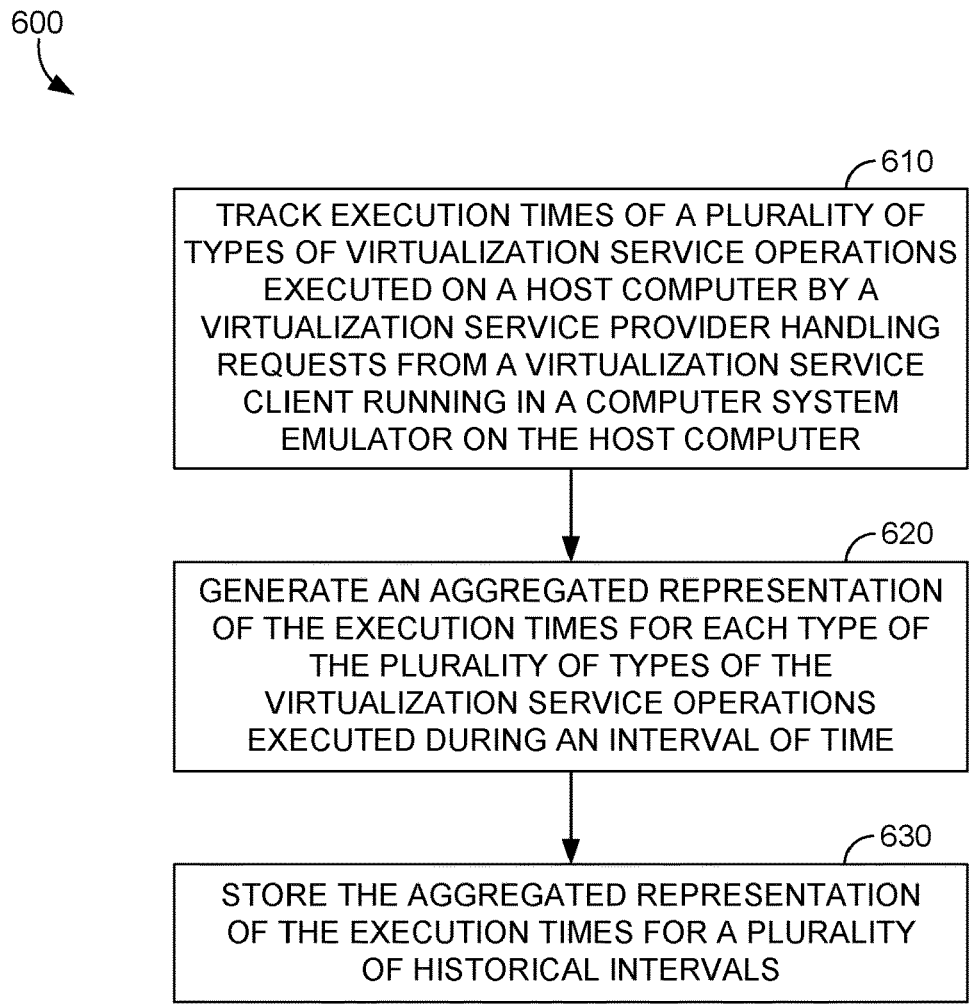
FIG. 6 is a flow diagram showing a method for generating an aggregated representation of execution times for different types of virtualization service operations, in accordance with embodiments.

FIG. 6 illustrates a method 600 for generating an aggregated representation of execution times for a plurality of types of virtualization service operations, in accordance with embodiments of the present disclosure. At block 610, execution times are tracked (e.g., by execution monitor 220 of FIG. 2) for a plurality of types of virtualization service operations executed on a host computer by a virtualization service provider handling requests from a virtualization service client running in a computer system emulator (e.g., a virtual machine, software container) on the host computer. At block 620, an aggregated representation is generated of the execution times for each type of the plurality of types of the virtualization service operations executed during an interval of time (e.g., by metric aggregation tool 250 of FIG. 2). At block 630, storing the aggregated representation of the execution times for a plurality of historical intervals (e.g., historical intervals metrics 275 of FIG. 2).

Figure 7:
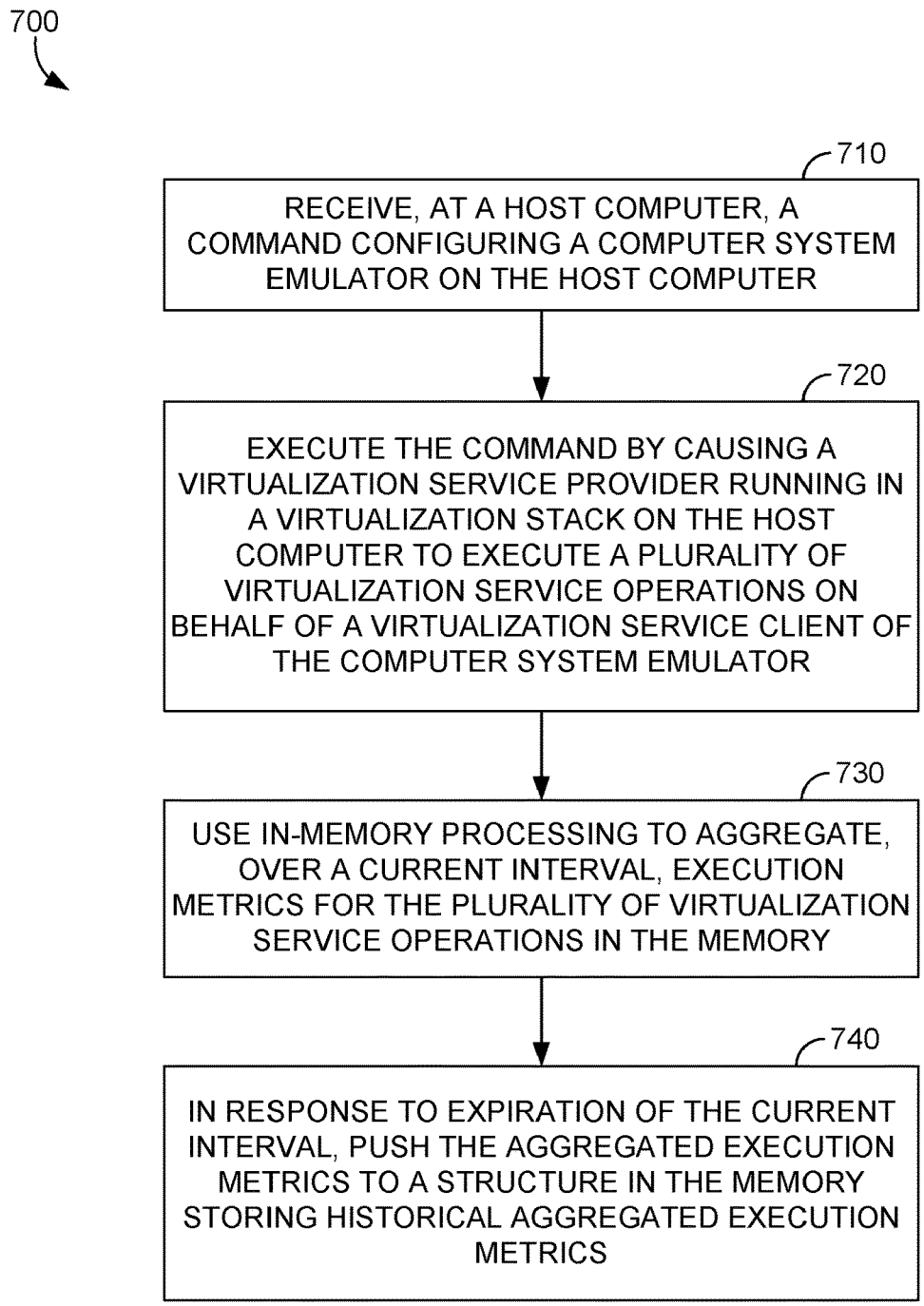
FIG. 7 is a flow diagram showing a method for aggregating execution metrics for virtualization service operations using in-memory processing, in accordance with embodiments.

FIG. 7 illustrates a method 700 for aggregating execution metrics for virtualization service operations using in-memory processing, in accordance with embodiments of the present disclosure. In some embodiments, at block 710, a command configuring a computer system emulator (e.g., a virtual machine, software container) on a host computer is received at the host computer. At block 720, the command is executed by causing a virtualization service provider (e.g., VSP 115 of FIG. 1) running in a virtualization stack on the host computer to execute a plurality of virtualization service operations on behalf of a virtualization service client of the computer system emulator. At block 730, in-memory processing is used (e.g., while executing the plurality of virtualization service operations) to aggregate, over a current interval, execution metrics for the plurality of virtualization service operations in the memory. At block 740, in response to expiration of the current interval, the aggregated execution metrics are pushed to a structure in the memory storing historical aggregated execution metrics (e.g., historical intervals metrics 275 of FIG. 2).

Figure 8:
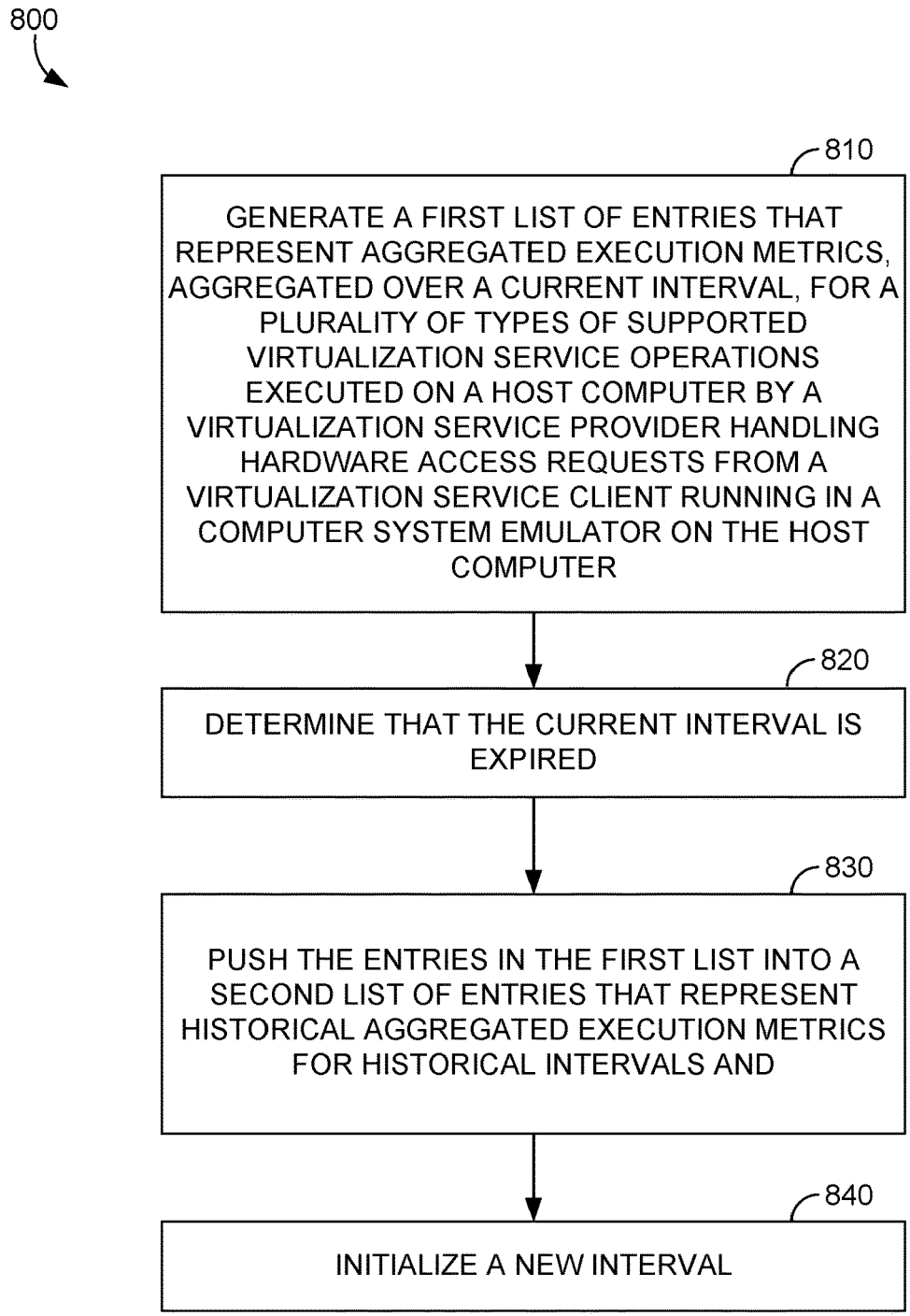
FIG. 8 is a flow diagram showing a method for representing aggregated executing metrics using two lists, in accordance with embodiments.

FIG. 8 illustrates a method 800 for representing aggregated executing metrics using two lists, in accordance with embodiments of the present disclosure. At block 810, a first list is generated (e.g., current interval metrics 270 of FIG. 2). The first list includes entries that represent aggregated execution metrics, aggregated over a current interval, for a plurality of types of supported virtualization service operations executed on a host computer by a virtualization service provider handling requests from a virtualization service client running in a computer system emulator (e.g., a virtual machine, software container) on the host computer. At block 820, a determination is made that the current interval is expired. At block 830, the entries in the first list are pushed into a second list of entries that represent historical aggregated execution metrics for historical intervals (e.g., historical intervals metrics 275 of FIG. 2). At block 840, a new interval is initialized. As such, the process may repeat any number of times to generate aggregated execution metrics for different intervals and push those aggregated execution metrics into the second list of entries.

Other Embodiments

As described herein, various implementations may be employed to generate or aggregate various types of execution metrics. In some implementations, a computing system is provided comprising a processor, and memory configured to provide computer program instructions to the processor. The computer instructions include an execution metrics tool. The execution metrics tool is configured to intercept an execution call, to a virtualization service provider running in a first partition on a host computer, from a virtualization service client running in a second partition on the host computer. The execution metrics tool is further configured to determine (e.g., based at least on intercepting the execution call) an execution metric representing performance of the virtualization service provider in executing a virtualization service operation triggered by the execution call. The execution metrics tool is further configured to aggregate the execution metric into an aggregation entry representing aggregated performance of instances of the virtualization service operation that were completed during an interval. As such, the execution metrics tool effectively generates and stores compressed execution metrics, freeing up storage capacity, permitting continuous operation without manual intervention, enabling storing execution metrics that represent a larger timeline using a smaller storage footprint, and facilitating more efficient retrieval and analysis over prior techniques that store raw data and other detail.

In any combination of the elements listed above, the execution metrics tool is further configured to allocate the aggregation entry in a data structure in response to detecting completion of a first instance of the instances of the virtualization service operation.

In any combination of the elements listed above, the aggregation entry stores an execution count and an average execution duration of the instances of the virtualization service operation that were completed during the interval.

In any combination of the elements listed above, the virtualization service provider comprises and is configured to execute the execution metrics tool to intercept the execution call, determine the execution metrics, and aggregate the execution metrics into the aggregation entry.

In any combination of the elements listed above, the memory further comprises a machine learning model configured to detect anomalous performance based on an encoded representation of the aggregated performance of the instances of the virtualization service operation that were completed during the interval.

In any combination of the elements listed above, the virtualization service client is configured to redirect device requests to the virtualization service provider executing in a management operating system executing in the first partition.

In any combination of the elements listed above, the virtualization service client is configured to utilize hardware resources of the host computer provided by the virtualization service provider.

In any combination of the elements listed above, the virtualization service client is configured to communicate with the virtualization service provider to satisfy device input/output requests of the second partition.

In some implementations, a computer storage medium stores computer-useable instructions that, when used by a computing device, cause the computing device to perform operations. The operations include tracking execution times of a plurality of types of virtualization service operations executed on the computing device by a virtualization service provider handling requests from a virtualization service client running in a computer system emulator on the computing device. The operations further include generating an aggregated representation of the execution times for each type of the plurality of types of the virtualization service operations executed during an interval of time. The operations further include storing the aggregated representation of the execution times in memory. This technique effectively generates and stores compressed execution metrics, freeing up storage capacity, permitting continuous operation without manual intervention, enabling storing execution metrics that represent a larger timeline using a smaller storage footprint, and facilitating more efficient retrieval and analysis over prior techniques that store raw data and other detail.

In any combination of the elements listed above, the operations further include retrieving, via a querying interface, the aggregated representation.

In any combination of the elements listed above, the operations further include exposing a configurable parameter that controls duration of the interval of time, duration of a plurality of historical intervals stored in memory, or which of the plurality of types of the virtualization service operations are tracked.

In any combination of the elements listed above, the plurality of types of the virtualization service operations includes corresponding virtualization service operations that are triggered by an input/output control (IOCTL), an object identifier (OID) method request, and a Remote Network Driver Interface Specification (RNDIS) message.

In any combination of the elements listed above, the virtualization service provider is configured to provide the virtualization service client with access to at least one of a network, storage, memory, or compute device.

In any combination of the elements listed above, the operations further include generating and aggregating execution metrics for a plurality of types of virtualization service providers operating in a plurality of layers of a virtualization stack.

In some implementations, a method is provided. The method includes intercepting an execution call, to a virtualization service provider running in a parent partition on a host computer, from a virtualization service client running in a child partition on the host computer. The method further includes determining (e.g., based at least on intercepting the execution call) an execution metric representing performance of the virtualization service provider in executing a virtualization service operation triggered by the execution call. The method further includes aggregating the execution metric into an aggregation entry representing aggregated performance of instances of the virtualization service operation that were completed during an interval. This technique effectively generates and stores compressed execution metrics, freeing up storage capacity, permitting continuous operation without manual intervention, enabling storing execution metrics that represent a larger timeline, and facilitating more efficient retrieval and analysis over prior techniques that store raw data and other detail.

In any combination of the elements listed above, the method further includes allocating the aggregation entry in a data structure in response to detecting completion of a first instance of the instances of the virtualization service operation.

In any combination of the elements listed above, the aggregation entry stores an execution count and an average execution duration of the instances of the virtualization service operation that were completed during the interval.

In any combination of the elements listed above, the method further includes provisioning the virtualization service provider with an execution metrics tool configured to perform the intercepting, the determining, and the aggregating.

In any combination of the elements listed above, the virtualization service client is configured to redirect device requests to the virtualization service provider executing in a management operating system executing in the parent partition.

In any combination of the elements listed above, the virtualization service client is configured to utilize hardware resources of the host computer provided by the virtualization service provider.

In some implementations, a computing system is provided comprising a processor, and memory configured to provide computer program instructions to the processor. The computer program instructions include an execution metrics tool configured to receive, on a host computer, a command configuring a computer system emulator on the host computer. The execution metrics tool is further configured to execute the command by causing a virtualization service provider running in a virtualization stack on the host computer to execute a plurality of virtualization service operations on behalf of a virtualization service client of the computer system emulator. The execution metrics tool is further configured to generate an aggregated execution metric by aggregating execution metrics for the plurality of virtualization service operations over a current interval in the memory (e.g., while executing the plurality of virtualization service operations). The execution metrics tool is further configured to push, in response to expiration of the current interval, the aggregated execution metrics to a structure in the memory storing historical aggregated execution metrics. Aggregating and processing execution metrics in memory enables faster lookup, faster processing (e.g., aggregation), and better CPU utilization. The benefits are compounded when implemented on multiple (e.g., every) machine in a fleet, or when implemented multiple times for each virtualization service provider on a given machine.

In any combination of the elements listed above, the execution metrics tool is further configured to store and update the execution metrics in a portion of the memory that is allocated to operating system processes.

In any combination of the elements listed above, the execution metrics tool is further configured to store and update the execution metrics in a portion of the memory that is allocated to processes of the virtualization stack.

In any combination of the elements listed above, the memory includes random access memory, flash memory, or virtual memory, and the execution metrics tool is further configured to store and update the execution metrics in a portion of the random access memory, the flash memory, or the virtual memory.

In any combination of the elements listed above, the execution metrics tool is further configured to aggregate the execution metrics separately for each type of supported operation of the plurality of virtualization service operations.

In any combination of the elements listed above, the execution metrics tool is further configured to aggregate the execution metrics for a plurality of types of virtualization service providers operating in plurality of layers of the virtualization stack.

In any combination of the elements listed above, the execution metrics tool is further configured to limit an age of the historical aggregated execution metrics stored in the memory by deleting from the memory expired data of the historical aggregated execution metrics.

In any combination of the elements listed above, the command instructs creation or deletion of the computer system emulator.

In any combination of the elements listed above, the plurality of virtualization service operations configures hardware or software of the host computer on behalf of the virtualization service client.

In some implementations, a computer storage medium stores computer-useable instructions that, when used by a computing device, cause the computing device to perform operations. The operations include receiving, on the computing device, a command configuring a computer system emulator on the computing device. The operations further include executing the command by causing a virtualization service provider running in a virtualization stack to execute a plurality of virtualization service operations configuring the computing device on behalf of a virtualization service client of the computer system emulator. The operations further include aggregating, over a current interval, execution metrics for the plurality of virtualization service operations using in-memory processing (e.g., while executing the plurality of virtualization service operations) and to push the aggregated execution metrics to a structure in memory storing historical aggregated execution metrics. Aggregating and processing execution metrics in memory enables faster lookup, faster processing (e.g., aggregation), and better CPU utilization. The benefits are compounded when implemented on multiple (e.g., every) machine in a fleet, or when implemented multiple times for each virtualization service provider on a given machine.

In any combination of the elements listed above, the operations further include storing and updating the execution metrics in a portion of the memory that is allocated to operating system processes.

In any combination of the elements listed above, the operations further include storing and updating the execution metrics in a portion of the memory that is allocated to processes of the virtualization stack.

In any combination of the elements listed above, the memory includes random access memory, flash memory, or virtual memory, and the operations further include storing and updating the execution metrics entirely in a portion of the random access memory, the flash memory, or the virtual memory.

In any combination of the elements listed above, the operations further include limiting an age of the historical aggregated execution metrics stored in the memory by deleting from the memory expired data of the historical aggregated execution metrics.

In some implementations, a method is provided. The method includes receiving, on a host computer, a command configuring a computer system emulator on the host computer. The method further includes executing the command by causing a virtualization service provider running in a virtualization stack on the host machine to execute a plurality of virtualization service operations configuring the host machine on behalf of a virtualization service client of the computer system emulator. The method further includes aggregating, over a current interval, execution metrics for the plurality of virtualization service operations using in-memory processing (e.g., while executing the plurality of virtualization service operations) and to pushing the aggregated execution metrics to a structure in memory storing historical aggregated execution metrics. Aggregating and processing execution metrics in memory enables faster lookup, faster processing (aggregation), and better CPU utilization. The benefits are compounded when implemented on every machine in a fleet, or when implemented multiple times for each virtualization service provider on a given machine.

In any combination of the elements listed above, the method further includes storing and updating the execution metrics in a portion of the memory that is allocated to processes of the virtualization stack.

In any combination of the elements listed above, using the in-memory processing to aggregate the execution metrics includes aggregating the execution metrics for a plurality of types of virtualization service providers operating in plurality of layers of the virtualization stack.

In any combination of the elements listed above, using the in-memory processing to aggregate the execution metrics includes aggregating the execution metrics separately for each type of supported operation of the plurality of virtualization service operations.

In any combination of the elements listed above, the command instructs creation or deletion of the computer system emulator.

In any combination of the elements listed above, the plurality of virtualization service operations configure hardware of the host computer on behalf of the virtualization service client.

In some implementations, a computing system is provided comprising a processor, and memory configured to provide computer program instructions to the processor. The computer program instructions include an execution metrics tool configured to generate a first list of entries that represent aggregated execution metrics for a current interval, for a plurality of types of supported virtualization service operations executed on a host computer by a virtualization service provider handling requests from a virtualization service client running in a computer system emulator on the host computer. The execution metrics tool is further configured to determine that the current interval is expired. The execution metrics tool is further configured to push the entries of the first list into a second list of entries that represent historical aggregated execution metrics for historical intervals. The execution metrics tool is further configured to initialize a new interval. Aggregating and storing execution metrics this way facilitates more efficient storage, retrieval, and aggregation. The benefits are compounded when implemented on every machine in a fleet, or when implemented multiple times for each virtualization service provider on a given machine.

In any combination of the elements listed above, the execution metrics tool is further configured to determine, in response to identifying completion of each instance of the supported virtualization service operations, whether the current interval is expired.

In any combination of the elements listed above, the execution metrics tool is further configured to determine, in response to identifying completion of each instance of a particular type of supported virtualization service operation of the plurality of types of supported operations, whether an entry exists in the first list for the particular type of supported virtualization service operation.

In any combination of the elements listed above, the execution metrics tool is further configured to allocate in the first list, in response to determining that an entry does not exist in the first list for a particular type of supported virtualization service operation of the plurality of types of supported virtualization service operations, a new entry that represents the aggregated execution metrics for instances of the particular type of supported virtualization service operation.

In any combination of the elements listed above, the determining that the current interval is expired is in response to identifying completion of a particular instance of a particular type of supported virtualization service operation of the plurality of supported virtualization service operations, and the execution metrics tool is further configured to begin repopulating the first list for the new interval with a first entry that represents execution metrics for the particular instance.

In any combination of the elements listed above, the second list includes a plurality of entries for a particular type of supported virtualization service operation of the plurality of types of supported virtualization service operations, and the plurality of entries represents the historical aggregated execution metrics for the particular type of supported virtualization service operation for a plurality of historical intervals, respectively.

In any combination of the elements listed above, the second list represents the historical aggregated execution metrics for each type of the plurality of types of supported virtualization service operations for each of the historical intervals.

In any combination of the elements listed above, the execution metrics tool is further configured to limit a number of the historical intervals represented by the second list by deleting, from the second list, expired entries of the historical aggregated execution metrics.

In any combination of the elements listed above, the memory includes random access memory, flash memory, or virtual memory, and the execution metrics tool is further configured to store and update the first and second lists using in-memory processing in the random access memory, the flash memory, or the virtual memory.

In some implementations, a computer storage medium stores computer-useable instructions that, when used by a computing device, cause the computing device to perform operations. The operations include generating a current list of entries that represent current aggregated execution metrics for a current interval, for a plurality of types of supported virtualization service operations executed by a virtualization service provider handling requests from a virtualization service client running in a computer system emulator. The operations further include, in response determining that the current interval is expired, (i) pushing the entries in the current list into a historical list of entries that represent historical aggregated execution metrics for historical intervals and (ii) initializing a new interval. Aggregating and storing execution metrics this way facilitates more efficient storage, retrieval, and aggregation. The benefits are compounded when implemented on multiple (e.g., every) machine in a fleet, or when implemented multiple times for each virtualization service provider on a given machine.

In any combination of the elements listed above, the determining that the current interval is expired is in response to identifying completion of a particular instance of a particular type of supported virtualization service operation of the plurality of supported virtualization service operations, and the operations further include populating the current list for the new interval with a first entry that represents execution metrics for the particular instance.

In any combination of the elements listed above, the historical list represents a corresponding set of the historical aggregated execution metrics for each of the supported virtualization service operations for each of the historical intervals.

In any combination of the elements listed above, the operations further include limiting a number of the historical intervals represented by the historical list by deleting, from the historical list, expired entries that represent expired sets of the historical aggregated execution metrics.

In any combination of the elements listed above, wherein the generating of the current list uses in-memory processing in random access memory, flash memory, or virtual memory.

In some implementations, a method is provided. The method includes generating a first list of aggregation entries that represent aggregated execution metrics for a current interval, for plurality of types of supported virtualization service operations executed on a host computer by a virtualization service provider handling requests from a virtualization service client running in a computer system emulator on the host computer. The method further includes, in response to determining that the current interval is expired, (i) pushing the aggregation entries in the first list into a second list of aggregation entries that represent historical aggregated execution metrics for historical intervals, and (ii) initializing a new interval. Aggregating and storing execution metrics this way facilitates more efficient storage, retrieval, and aggregation. The benefits are compounded when implemented on multiple (e.g., every) machine in a fleet, or when implemented multiple times for each virtualization service provider on a given machine.

In any combination of the elements listed above, the method further includes, in response to identifying completion of each instance of the supported virtualization service operations, determining whether the current interval is expired.

In any combination of the elements listed above, the method further includes, in response to identifying completion of each instance of a particular type of the plurality of types of supported virtualization service operations, determining whether an aggregation entry exists in the first list for the particular type.

In any combination of the elements listed above, the method further includes, in response to determining that an aggregation entry does not exist in the first list for a particular type of supported virtualization service operation of the plurality of types of supported virtualization service operations, allocating in the first list a new aggregation entry that represents the aggregated execution metrics for instances of the particular type of supported virtualization service operation.

In any combination of the elements listed above, the determining that the current interval is expired is in response to identifying completion of a particular instance of a particular type of supported virtualization service operation of the plurality of supported virtualization service operations, and the method further includes populating the first list for the new interval with a first aggregation entry that represents execution metrics for the particular instance.

In any combination of the elements listed above, the second list includes a plurality of aggregation entries for a particular type of supported virtualization service operation of the plurality of types of supported virtualization service operations, and the plurality of aggregation entries represents the historical aggregated execution metrics for the particular type of supported virtualization service operation for a plurality of historical intervals, respectively.

Example Distributed Computing Environment

Figure 9:
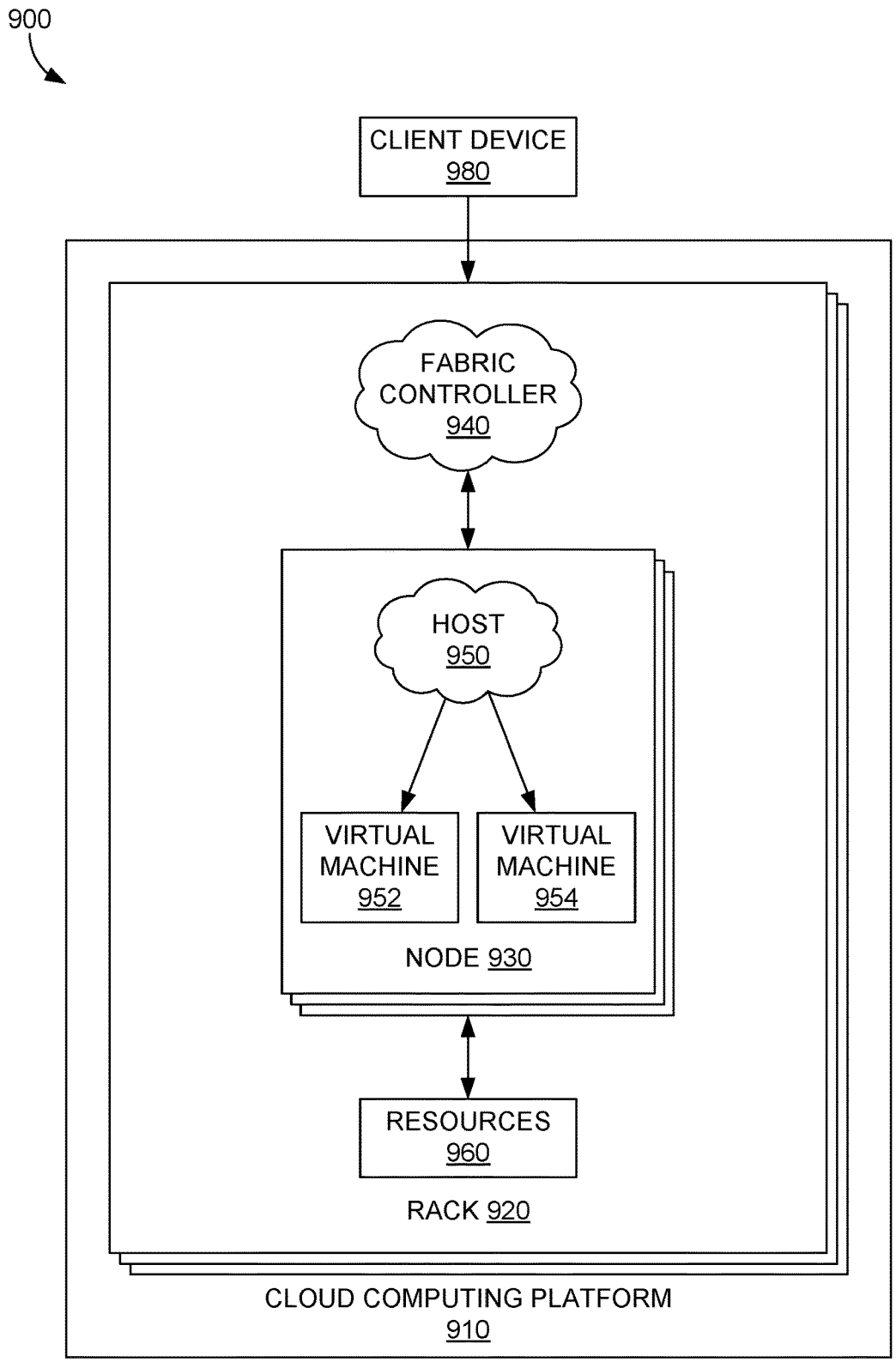
FIG. 9 is a block diagram of an example computing environment in which embodiments described herein may be employed.

Referring now to FIG. 9, FIG. 9 illustrates an example distributed computing environment 900 in which implementations described in the present disclosure may be employed. In particular, FIG. 9 shows a high-level architecture of an example cloud computing platform 910 that can host a virtualization environment. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 900 that includes cloud computing platform 910, rack 920, and node 930 (e.g., computing devices, processing units, or blades) in rack 920. The virtualization environment can be implemented with cloud computing platform 910 that runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. Cloud computing platform 910 may be a public cloud, a private cloud, or a dedicated cloud.

Node 930 can be provisioned with host 950 (e.g., operating system or runtime environment) running a defined software stack on node 930. Node 930 can also be configured to perform specialized functionality (e.g., compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 930, nodes 930 may be partitioned into virtual machines (e.g., virtual machine 952 and virtual machine 954). Physical machines can also concurrently run separate service applications. The virtual machines or physical machines can be configured as individualized computing environments that are supported by resources 960 (e.g., hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device referred to as a cluster. Each server in the cluster can be implemented as a node.

Client device 980 may be linked to a service application in cloud computing platform 910. Client device 980 may be any type of computing device, which may correspond to computing device 900 described with reference to FIG. 9, for example. Client device 980 can be configured to issue commands to cloud computing platform 910. In some implementations, client device 980 may communicate with service applications through a virtual Internet Protocol (IP) and load balancer or other means that direct communication requests to designated endpoints in cloud computing platform 910. The components of cloud computing platform 910 may communicate with each other over a network (not shown), which may include one or more local area networks (LANs) and/or wide area networks (WANs).

Example Operating Environment

Having briefly described an overview of certain implementations, an example operating environment is described below in order to provide a general context in which various aspects of the present disclosure may operate. Referring initially to FIG. 10 in particular, an example operating environment is shown and designated generally as computing device 1000. Computing device 1000 is but one example of a suitable computing environment and is not intended to suggest any limitation as to the scope of use or functionality described herein. Neither should computing device 1000 be interpreted as having any dependency or requirement relating to any one or combination of components illustrated.

The disclosed systems and methods may be described in the general context of computer code or machine-useable instructions, including computer-executable instructions such as program modules, being executed by a computer or other machine, such as a personal data assistant or other handheld device. Generally, program modules (e.g., including or referencing routines, programs, objects, components, libraries, classes, variables, data structures) refer to code that perform particular tasks or implement particular abstract data types. The disclosed systems and methods may be practiced in a variety of system configurations, including hand-held devices, consumer electronics, general-purpose computers, more specialty computing devices, etc. The disclosed systems and methods may also be practiced in distributed computing environments where tasks are performed by remote-processing devices that are linked through a communications network.

Figure 10:
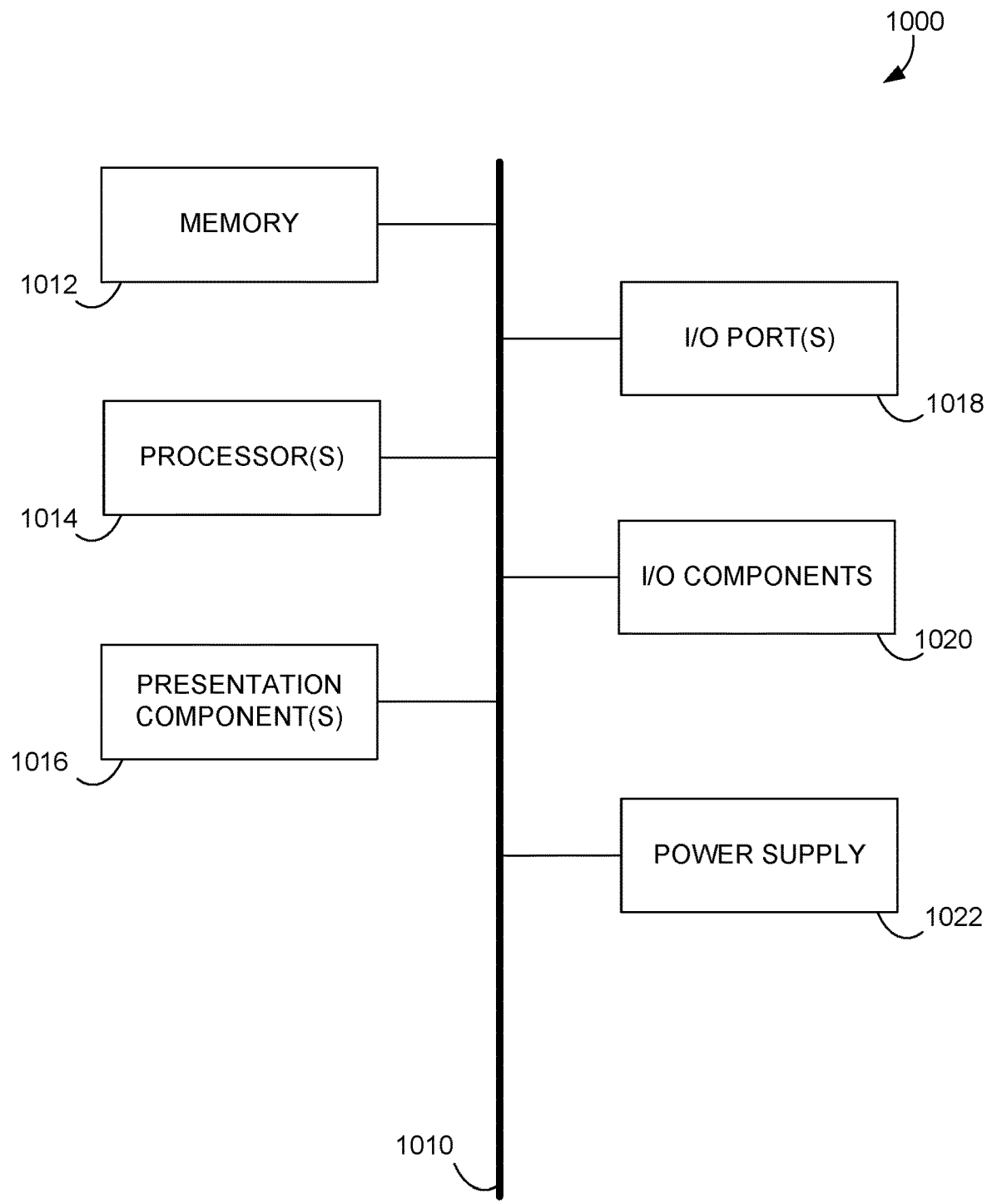
FIG. 10 is a block diagram of an example computing environment suitable for use in implementing embodiments described herein.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. As such, the diagram of FIG. 10 is merely illustrative of an example computing device that can be used in connection with one or more implementations. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes RAM, read-only memory (ROM), electrically erasable programmable read-only memory (EEPROM), flash memory, or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. Combinations of any of the above are included within the scope of computer-readable media.

Memory 1012 includes computer storage media in the form of volatile and/or nonvolatile memory. The memory may be removable, non-removable, or a combination thereof. Example hardware devices include solid-state memory, hard drives, optical-disc drives, etc. Computing device 1000 includes one or more processors that read data from various entities such as memory 612 or I/O components 1020. Presentation component(s) 1016 present data indications to a user or other device. Example presentation components include a display device, speaker, printing component, vibrating component, etc.

I/O ports 1018 allow computing device 1000 to be logically coupled to other devices including I/O components 1020, some of which may be built in. Illustrative I/O components include a microphone, joystick, game pad, satellite dish, scanner, printer, wireless device, etc.

With reference to the virtualization environment described herein, certain implementations described herein support generating and aggregating execution metrics. The components of the virtualization environment can be integrated components that include a hardware architecture and a software framework that support various functionality within a virtualization system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated.

By way of example, the virtualization system can include an application programming interface (API) library that includes specifications for routines, data structures, object classes, and variables may support the interaction between the hardware architecture of the device and the software framework of the virtualization system. These APIs include configuration specifications for the virtualization system such that the different components therein can communicate with each other in the virtualization system, as described herein.

Having identified various components utilized herein, it should be understood that any number of components and arrangements may be employed to achieve the desired functionality within the scope of the present disclosure. For example, the components in the implementations depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Implementations described in the paragraphs below may be combined with one or more of the specifically described alternatives. In particular, an implementation that is claimed may contain a reference, in the alternative, to more than one other implementation.

The subject matter of implementations of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to represent different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, certain implementations of the present disclosure are described with reference to a distributed computing environment; however the distributed computing environment depicted herein is merely illustrative. Components can be configured for performing novel aspects of certain implementations, where the term "configured for" can refer to "programmed to" perform particular tasks or implement particular abstract data types using code. Further, while the discussion of some implementations may reference to the virtualization system and the schematics described herein, it is understood that the techniques described may be extended to other implementation contexts.

Implementations of the present disclosure have been described in relation to particular examples which are intended in all respects to be illustrative rather than restrictive. Alternative implementations will become apparent to those of ordinary skill in the art to which the present disclosure pertains without departing from its scope.

From the foregoing, it will be seen that the disclosed systems and methods are well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
 a processor; and
 memory comprising computer executable instructions that, when executed, perform operations to:
  intercept an execution call from a virtualization service client running in a second partition to a virtualization service provider running in a first partition, wherein the virtualization service client runs in a computer system emulator on a host machine and the execution call requests access to resources of the host computer for the computer system emulator, and wherein the virtualization service provider is provisioned with an execution metrics tool;

determine, using the execution metrics tool, an execution metric representing performance of the virtualization service provider in executing a virtualization service operation triggered by the execution call;

aggregate, using the execution metrics tool, the execution metric into an aggregation entry based on an operation type of the virtualization service operation, the aggregation entry representing aggregated performance of instances of the virtualization service operation that were completed during a current interval; and store the aggregation entry in a data structure comprising stored execution metrics for a previous interval.

2. The computer system of claim 1, wherein storing the aggregation entry in the data structure comprises allocating the aggregation entry in the data structure in response to detecting completion of a first instance of the instances of the virtualization service operation.

3. The computer system of claim 1, wherein the aggregation entry stores an execution count and an average execution duration of the instances of the virtualization service operation that were completed during the current interval.

4. The computer system of claim 1, wherein the execution metrics tool is used to allocate the aggregation entry to the data structure.

5. The computer system of claim 1, the memory further comprising a machine learning model configured to detect anomalous performance based on an encoded representation of the aggregated performance of the instances of the virtualization service operation that were completed during the current interval.

6. The computer system of claim 1, wherein the virtualization service client is configured to redirect device requests to the virtualization service provider executing in a management operating system executing in the first partition.

7. The computer system of claim 1, wherein the virtualization service client is configured to utilize hardware resources provided by the virtualization service provider.

8. The computer system of claim 1, wherein the virtualization service client is configured to communicate with the virtualization service provider to satisfy device input/output requests of the second partition.

9. A method comprising:

intercepting an execution call from a virtualization service client running in a child partition to a virtualization service provider running in a parent partition, wherein the virtualization service client runs in a computer system emulator on a host machine and the execution call requests access to resources of the host computer for the computer system emulator, and wherein the virtualization service provider is provisioned with an execution metrics tool;

determining, using the execution metrics tool, an execution metric representing performance of the virtualization service provider in executing a virtualization service operation triggered by the execution call;

aggregating, using the execution metrics tool, the execution metric into an aggregation entry based on an operation type of the virtualization service operation, the aggregation entry representing aggregated performance of instances of the virtualization service operation that were completed during an interval; and detecting anomalous behavior of the virtualization service operation based on the aggregation entry.

10. The method of claim 9, further comprising allocating the aggregation entry in a data structure in response to detecting completion of a first instance of the instances of the virtualization service operation.

11. The method of claim 9, wherein the aggregation entry stores an execution count and an average execution duration of the instances of the virtualization service operation that were completed during the interval.

12. The method of claim 9, wherein the execution metrics tool is further used for intercepting the execution call.

13. The method of claim 9, wherein the virtualization service client is configured to redirect device requests to the virtualization service provider executing in a management operating system executing in the parent partition.

14. The method of claim 9, wherein the virtualization service client is configured to utilize hardware resources provided by the virtualization service provider.

15. A device comprising:

a processor; and memory comprising computer executable instructions that, when executed, perform operations comprising:

intercepting an execution call from a virtualization service client running in a second partition to a virtualization service provider running in a first partition, wherein the virtualization service client runs in a computer system emulator on a host machine and the execution call requests access to resources of the host computer for the computer system emulator, and wherein the virtualization service provider is provisioned with an execution metrics tool;

determining, using the execution metrics tool, an execution metric representing performance of the virtualization service provider in executing a virtualization service operation triggered by the execution call;

aggregating, using the execution metrics tool, the execution metric into an aggregation entry based on an operation type of the virtualization service operation, the aggregation entry representing aggregated performance of instances of the virtualization service operation that were completed during a current interval; and storing the aggregation entry in a data structure comprising stored execution metrics for a previous interval.

16. The device of claim 15, wherein storing the aggregation entry in the data structure comprises allocating the aggregation entry in the data structure in response to detecting completion of a first instance of the instances of the virtualization service operation.

17. The device of claim 15, wherein the aggregation entry stores at least one of an execution count and an average execution duration of the instances of the virtualization service operation that were completed during the current interval.

18. The device of claim 15, the operations further comprising:

detecting anomalous behavior of the virtualization service operation based on the aggregation entry.

19. The device of claim 18, wherein the anomalous behavior is detected based on an encoded representation of the aggregated performance of the instances of the virtualization service operation that were completed during the current interval.

20. The device of claim 19, wherein the anomalous behavior is detected by a machine learning model that is trained to detect anomalous behavior based on manually tagged instances of anomalous behavior.

* * * * *